(12) United States Patent
Kimura et al.

(10) Patent No.: US 8,737,404 B2
(45) Date of Patent: May 27, 2014

(54) NON-TRANSITORY COMPUTER READABLE STORAGE MEDIUM, INFORMATION COMMUNICATION DEVICE AND METHOD

(75) Inventors: Masatoshi Kimura, Kawasaki (JP); Yuichi Miura, Kawasaki (JP); Eiji Ishioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 13/358,565

(22) Filed: Jan. 26, 2012

(65) Prior Publication Data
US 2012/0250577 A1    Oct. 4, 2012

(30) Foreign Application Priority Data
Mar. 31, 2011    (JP) .................. 2011-081116

(51) Int. Cl.
*H04L 12/28* (2006.01)
(52) U.S. Cl.
USPC .................... 370/395.2; 370/395.3
(58) Field of Classification Search
USPC ................... 370/254, 395.2, 395.3
See application file for complete search history.

(56) References Cited

U.S. PATENT DOCUMENTS

| | | | |
|---|---|---|---|
| 6,782,260 B2 | 8/2004 | Nakakita et al. | |
| 7,324,805 B2 | 1/2008 | Nakakita et al. | |
| 2006/0282541 A1* | 12/2006 | Hiroki | 709/228 |
| 2008/0220741 A1 | 9/2008 | Hung | |
| 2011/0280230 A1* | 11/2011 | Rawlins et al. | 370/338 |

FOREIGN PATENT DOCUMENTS

| | | |
|---|---|---|
| JP | 2002-159053 A | 5/2002 |
| JP | 2005-117247 A | 4/2005 |
| KR | 2006-0027633 | 3/2006 |
| KR | 10-0748683 B1 | 8/2007 |

OTHER PUBLICATIONS

Extended European Search Report dated Nov. 7, 2012 for corresponding European Application No. 12150604.2.
Korean Office Action mailed May 28, 2013 for corresponding Korean Application No. 10-2012-0006595, with English-language Translation.
Korean Office Action mailed Dec. 20, 2013 for corresponding Korean Application No. 10-2012-0006595, with English-language translation.

* cited by examiner

*Primary Examiner* — Sai-Ming Chan
(74) *Attorney, Agent, or Firm* — Fujitsu Patent Center

(57) ABSTRACT

A method for linking between a first information communication device and a second information communication device in wireless communication. The method includes transmitting, by the first information communication device executing any one of a station function and an access point function of wireless communication, information for a connection to the second information communication device executing the other function and storing, by the second information communication device, received information. The method also includes requesting, by the first information communication device, the second information communication device to transmit the information and storing, by the first information communication device, the received information.

7 Claims, 32 Drawing Sheets

FIG.5A

| CHARACTER STRING | | | NUMBER OF CHARACTERS | CONTENT |
|---|---|---|---|---|
| PC-NB | PC-DT | MOBILE PHONE | | |
| DEVICE NAME | | | 1 TO 15 CHARACTERS | DEVICE NAME |
| _ (UNDERSCORE) | | | 1 CHARACTER | DELIMITER |
| MAC ADDRESS | | | 12 CHARACTERS | MAC ADDRESS |

TOTAL NUMBER OF CHARACTERS: 14 TO 28 CHARACTERS

FIG.5B

| CHARACTER STRING | | | NUMBER OF CHARACTERS | CONTENT |
|---|---|---|---|---|
| PC-NB | PC-DT | MOBILE PHONE | | |
| USER UNIQUE | | | 1 TO 28 CHARACTERS | USER UNIQUE CHARACTER STRING (ASCII) |

TOTAL NUMBER OF CHARACTERS: 1 TO 28 CHARACTERS

FIG.5C

| CHARACTER STRING | | | NUMBER OF CHARACTERS | CONTENT |
|---|---|---|---|---|
| PC-NB | PC-DT | MOBILE PHONE | | |
| $RN | $RD | $RM | 3 CHARACTERS | AUTOMATIC CONNECTION DISCRIMINATION STRING |
| _ (UNDERSCORE) | | | 1 CHARACTER | DELIMITER |
| SSID FOR NORMAL OPERATION | | | 1 TO 28 CHARACTERS | SSID FOR NORMAL OPERATION |

TOTAL NUMBER OF CHARACTERS: 5 TO 32 CHARACTERS

FIG.5D

| CHARACTER STRING | | | NUMBER OF CHARACTERS | CONTENT |
|---|---|---|---|---|
| PC-NB | PC-DT | MOBILE PHONE | | |
| $FN | $FD | $FM | 3 CHARACTERS | AUTOMATIC CONNECTION DISCRIMINATION STRING |
| _ (UNDERSCORE) | | | 1 CHARACTER | DELIMITER |
| SSID FOR NORMAL OPERATION | | | 1 TO 28 CHARACTERS | SSID FOR NORMAL OPERATION |

TOTAL NUMBER OF CHARACTERS: 5 TO 32 CHARACTERS

FIG.5E

| CHARACTER STRING | | | NUMBER OF CHARACTERS | CONTENT |
|---|---|---|---|---|
| PC-NB | PC-DT | MOBILE PHONE | | |
| !RN | !RD | !RM | 3 CHARACTERS | AUTOMATIC CONNECTION DISCRIMINATION STRING |
| _ (UNDERSCORE) | | | 1 CHARACTER | DELIMITER |
| SSID FOR NORMAL OPERATION | | | 1 TO 28 CHARACTERS | SSID FOR NORMAL OPERATION |

TOTAL NUMBER OF CHARACTERS: 5 TO 32 CHARACTERS

FIG.5F

| CHARACTER STRING | | | NUMBER OF CHARACTERS | CONTENT |
|---|---|---|---|---|
| PC-NB | PC-DT | MOBILE PHONE | | |
| !FN | !FD | !FM | 3 CHARACTERS | AUTOMATIC CONNECTION DISCRIMINATION STRING |
| _ (UNDERSCORE) | | | 1 CHARACTER | DELIMITER |
| SSID FOR NORMAL OPERATION | | | 1 TO 28 CHARACTERS | SSID FOR NORMAL OPERATION |

TOTAL NUMBER OF CHARACTERS: 5 TO 32 CHARACTERS

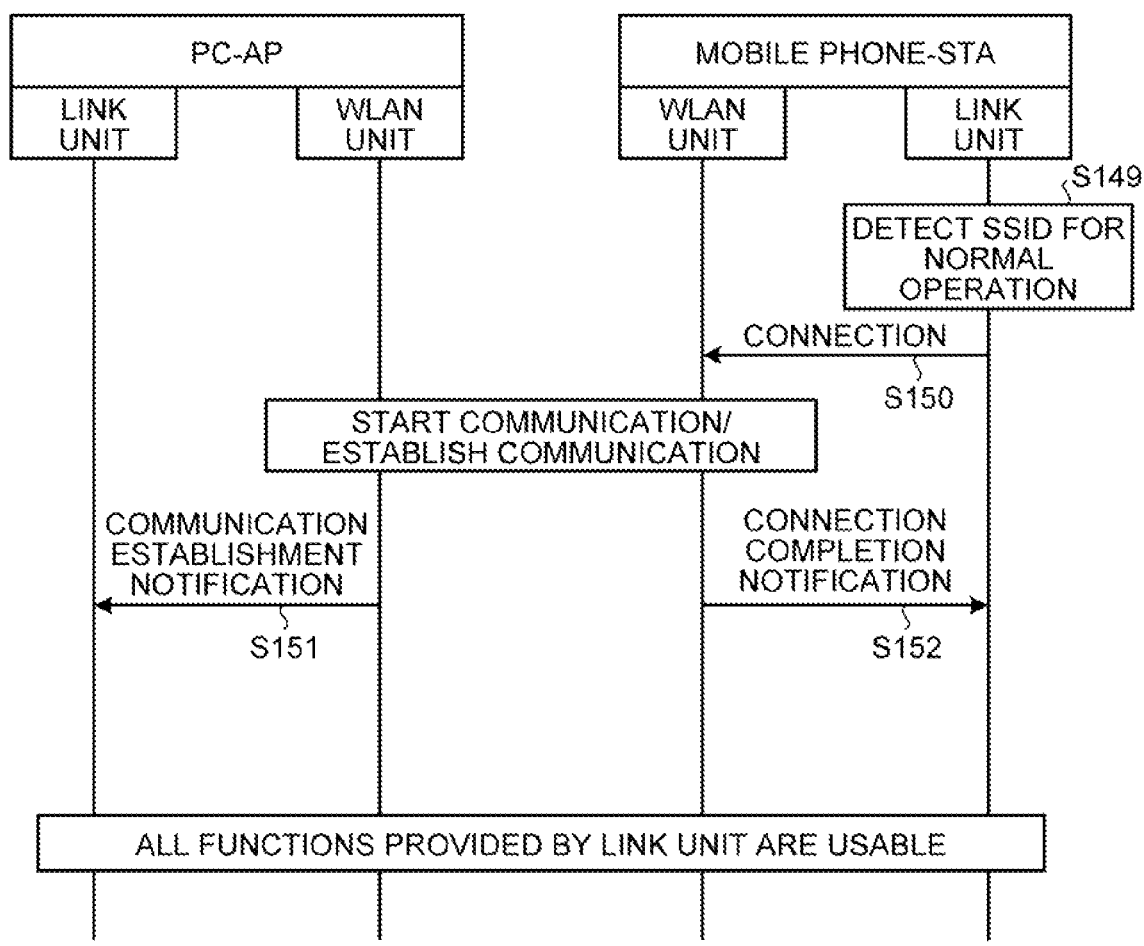

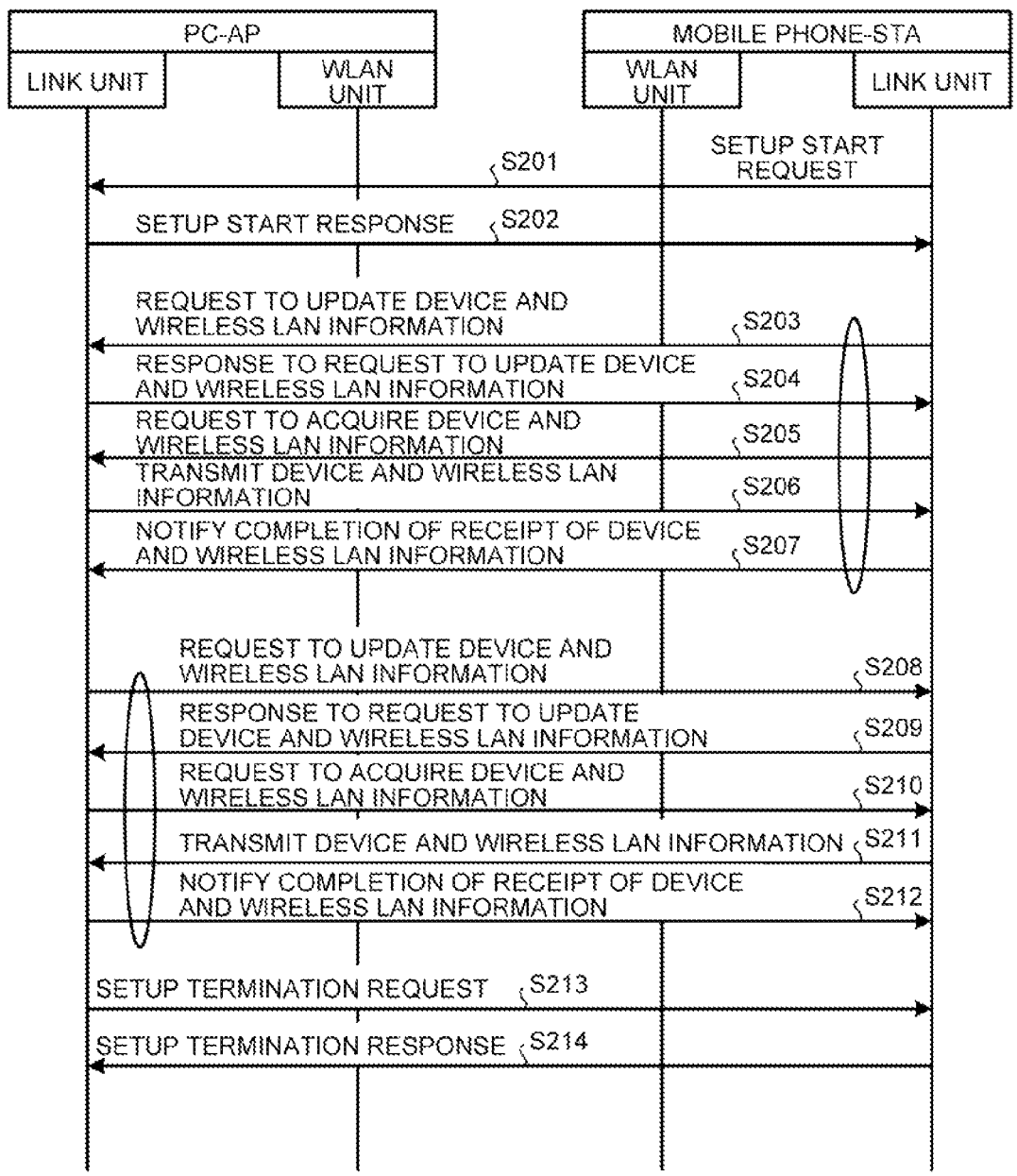

FIG.9

| VERSION NUMBER | | VERSION INFORMATION OF LINK UNIT |
|---|---|---|
| MODEL | | CATEGORY INFORMATION OF DEVICE |
| MAC ADDRESS | | MAC ADDRESS INFORMATION OF DEVICE ITSELF |
| HARDWARE INFORMATION | LCD INFORMATION | INFORMATION ON NUMBER OF PIXELS OF LCD |
| | CAMERA INFORMATION | INFORMATION ON NUMBER OF PIXELS OF CAMERA |
| INDIVIDUAL FUNCTION | WakeOnLAN | INFORMATION WHETHER TO SUPPORT WakeOnLAN |
| LINK FUNCTIONS | PICTURES | INFORMATION ON CAPTURE OF PICTURES<br>0 = UNSUPPORTED<br>1 = SUPPORTED |
| | MOVING IMAGES | INFORMATION ON CAPTURE OF MOVING IMAGES<br>0 = UNSUPPORTED<br>1 = SUPPORTED |
| | NUMBER OF STEPS/ AMOUNT OF ACTIVITY | INFORMATION ON CAPTURE OF NUMBER OF STEPS/AMOUNT OF ACTIVITY<br>0 = UNSUPPORTED<br>1 = SUPPORTED |
| | AP SWITCHING | INFORMATION ON FUNCTION OF INTERCHANGING AP OF PC AND STA OF MOBILE PHONE AND CONNECTING WITH INTERNET VIA AP OF MOBILE PHONE<br>0 = UNSUPPORTED<br>1 = SUPPORTED |

FIG.12

| | | |
|---|---|---|
| LINK FUNCTIONS | PICTURES | SETTING NOTIFICATION OF CAPTURE OF PICTURES<br>0 = INVALID<br>1 = VALID |
| | MOVING IMAGES | SETTING NOTIFICATION OF CAPTURE OF MOVING IMAGES<br>0 = INVALID<br>1 = VALID |
| | NUMBER OF STEPS/ AMOUNT OF ACTIVITY | SETTING NOTIFICATION OF NUMBER OF STEPS/ AMOUNT OF ACTIVITY<br>0 = INVALID<br>1 = VALID |
| | AP SWITCHING | SETTING NOTIFICATION OF FUNCTION OF INTERCHANGING AP OF PC AND STA OF MOBILE PHONE AND CONNECTING WITH INTERNET VIA AP OF MOBILE PHONE<br>0 = INVALID<br>1 = VALID |

FIG.17C

AWAY-FROM-HOME MODE

SETTINGS OF AUTOMATIC CONNECTION (AP)
ENTER PASSKEY TO CONNECT FOR USE AWAY FROM HOME.

IN HOME MODE (WITHOUT PASSKEY)

AWAY FROM HOME MODE (WITH PASSKEY: 8 OR MORE SINGLE-BYTE ALPHANUMERIC CHARACTERS ARE RECOMMENDED)

PASSKEY 4 TO 32 SINGLE-BYTE ALPHANUMERIC CHARACTERS
(SYMBOLS ARE UNACCEPTABLE)

☑ HIDE PASSKEY

`********`

28 REMAINING CHARACTERS

[ START AUTOMATIC CONNECTION ]  [ CANCEL ]

FIG.17D

FILE SELECTION CONTROL

| DIRECT TRANSMISSION | DIRECT TRANSMISSION | DIRECT TRANSMISSION |
|---|---|---|
| DATABOX | MY PICTURE | CAMERA |
| 📁 MY PICTURE | 📁 CAMERA | (thumbnails) |
| 📁 MUSIC | 📁 i-MODE | |
| 📁 i-MOTION | 📁 DECO-MAIL PICTURES | |
| 📁 MY DOCUMENT | 📁 DECO-MAIL PICTOGRAMS | |
| 📁 ONE SEGMENT | 📁 DATA EXCHANGE | |
| SUB-MENU / BACK | SUB-MENU / BACK | SUB-MENU / CONFIRM SELECTION / BACK |

U.S. 8,737,404 B2

NON-TRANSITORY COMPUTER READABLE STORAGE MEDIUM, INFORMATION COMMUNICATION DEVICE AND METHOD

CROSS-REFERENCE TO RELATED APPLICATION

This application is based upon and claims the benefit of priority of the prior Japanese Patent Application No. 2011-081116, filed on Mar. 31, 2011, the entire contents of which are incorporated herein by reference.

FIELD

The embodiment discussed herein is directed to a non-transitory computer readable storage medium, an information communication device and a method.

BACKGROUND

It has been needed heretofore to set up an SSID (Service Set IDentifier) and an encryption key of an access point (hereinafter referred to as "AP") (or a router with a built-in AP) in an information processing device in order for the information processing device to connect to the AP of a wireless LAN. The technologies of AOSS (AirStation One-Touch Secure System) and WPS (Wi-Fi Protected Setup) are known as a technology for simplifying work on this setting (hereinafter also referred to as setup).

In AOSS, encryption keys are exchanged between an information processing device and an AP by use of an original encryption technology thereof upon setup to connect between devices and to perform security settings. If the information processing device temporarily connects with the AP at an early stage of the setup, the AP transmits an SSID of the same value shared with other APs to the information processing device, and the information processing device sets the received SSID to perform a setup process. Moreover, the information processing device receives from the AP an SSID automatically generated by the AP according to the setup to set the received SSID. The information processing device connects to the AP with the SSID under normal operation to perform data communication.

In WPS, the information processing device receives an SSID automatically generated by the AP and an encryption key upon setup to set the received SSID and encryption key. The information processing device connects to the AP with the SSID and encryption key under normal operation to perform data communication.

Patent Document 1: Japanese Laid-open Patent Publication No. 2002-159053
Patent Document 2: Japanese Laid-open Patent Publication No. 2005-117247

However, in the conventional AOSS and WPS, the information processing device sets an SSID and an encryption key of an AP in the device itself to connect to the AP.

SUMMARY

According to an aspect of an embodiment of the invention, a non-transitory computer readable storage medium stores a program. The program causes a computer to execute a process including transmitting information used for a connection of wireless communication, the information being of the information communication device executing any one of a station function and an access point function of wireless communication, to other information communication device executing the other function at request of the other information communication device to transmit the information; and requesting the other information communication device to transmit the information of the other information communication device when receiving a notification of receipt of the transmitted information from the other information communication device.

BRIEF DESCRIPTION OF DRAWINGS

FIG. 5A is an exemplary illustration of a data structure of an SSID at the time of shipping;
FIG. 5B is an exemplary illustration of a data structure of an SSID after being changed by the user;
FIG. 5C is an exemplary illustration of a data structure of a setup-mode SSID (without a passkey);
FIG. 5D is an exemplary illustration of a data structure of a setup-mode SSID (with a passkey);
FIG. 5E is an exemplary illustration of a data structure of a quick-mode SSID (without a passkey);
FIG. 5F is an exemplary illustration of a data structure of a quick-mode SSID (with a passkey);
FIG. 6C illustrates the processing sequence in the setup mode according to the embodiment;
FIG. 8 illustrates a setup sequence;
FIG. 9 is an exemplary illustration of a data structure of profile information;
FIG. 12 is an exemplary illustration of a data structure of a setting information file.

FIG. 17C is an exemplary illustration of an away-from-home mode screen;

FIG. 17D is an exemplary illustration of a file selection screen;

DESCRIPTION OF EMBODIMENT

Preferred embodiments of the present invention will be explained with reference to accompanying drawings. In the embodiment, information communication devices indicate PCs and mobile phones, which have a wireless LAN (Local Area Network) function. These devices are examples of the information communication devices, and the present invention is not limited by the embodiment.

Embodiment

Firstly, with regard to a link between information communication devices according to the embodiment, a description will be given of connection operation being prerequisite for linking. The connection operation being prerequisite for linking includes a "setup mode" and a "quick mode." The "setup mode" is an operating mode used when mutually registering an SSID (Service Set Identifier) used under "normal operation" and device information between information communication devices after authentication, and connecting to a network at all times under normal operation. Here, the "normal operation" indicates performing data communication in a normal wireless LAN environment. Moreover, the "setup" indicates a setting process for enabling the normal operation between information communication devices. The setting process includes, for example, an authentication and registration process. The "quick mode" is an operating mode used when information communication devices, both of which do not belong to a network, temporarily connect to the network. When a connection to a network is made in the quick mode, for example, data may be temporarily transmitted and received between the information communication devices. Incidentally, the wireless LAN environment in the embodiment adopts, for example, Wi-Fi (Wireless Fidelity), but is not limited to this. Moreover, in the wireless communication, an SSID is an access point identifier given to identify an access point. Moreover, an SSID used under normal operation is an example of a first access point identifier. Moreover, an SSID used under normal operation is an example of a third access point identifier.

Figure 1:
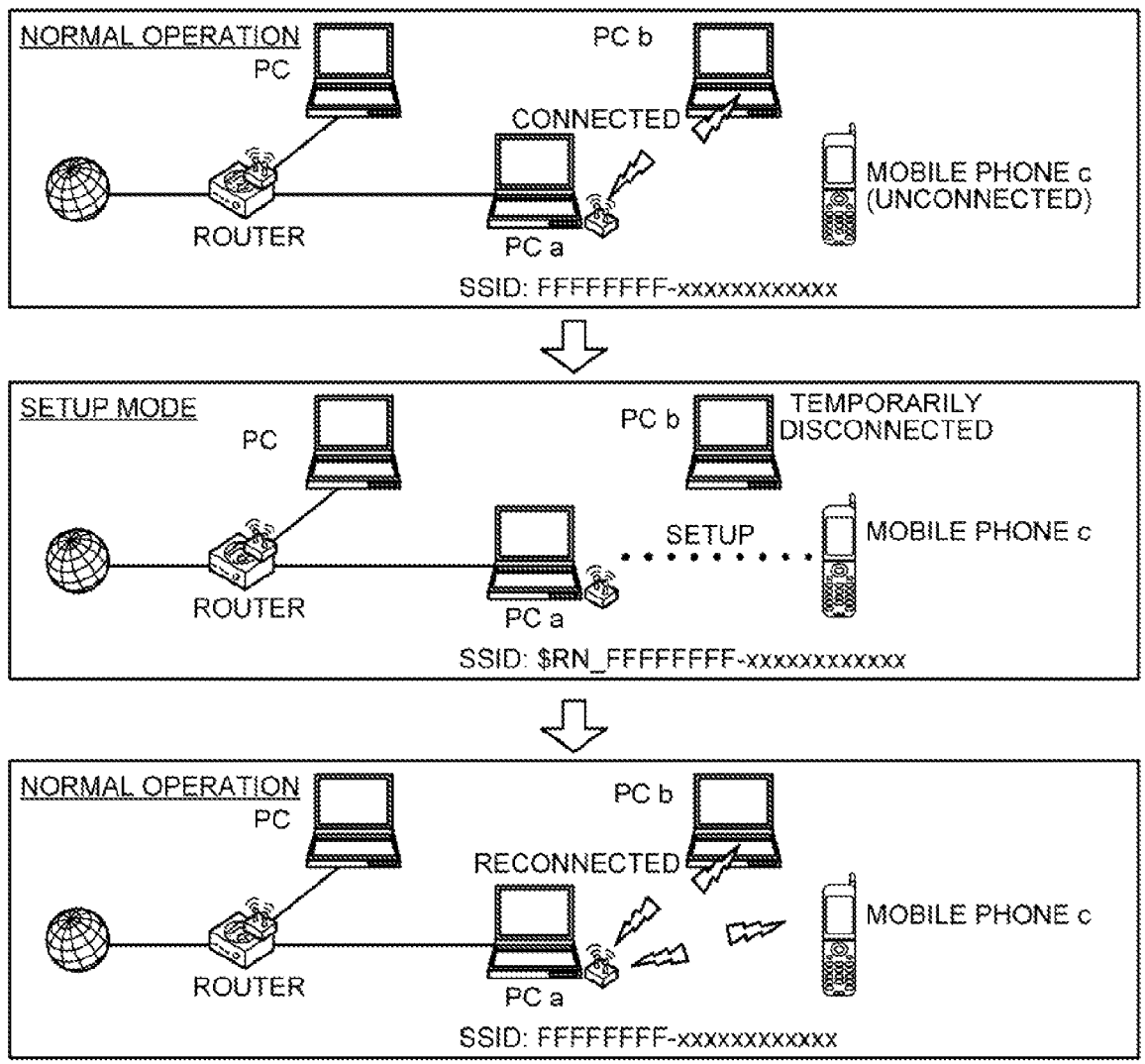
FIG. 1 is an explanatory view of an outline of connection operation in a setup mode.

FIG. 1 is an explanatory view of an outline of connection operation in the setup mode. In the example of FIG. 1, a description will be given of a case where a personal computer (PC) a operates as an access point, and a mobile phone c operates as a station (client device). As depicted in FIG. 1, "FFFFFFFF-xxxxxxxxxxxx" is set for the PC a as an SSID for normal operation. Moreover, the PC a is categorized as a laptop PC.

Under such a condition, a PC b sets an SSID for normal operation to connect with the PC a being an access point. At this time, the mobile phone c being a station is assumed to be in a state unconnected with the PC a.

The mobile phone c then attempts to connect with the PC a being an access point in the setup mode. At this time, the PC a being an access point adds to the SSID for normal operation an identifier in accordance with the presence or absence of a passkey indicating a password used for a network construction process and authentication and the category of the device itself. Here, the PC a adds to the SSID for normal operation an identifier in accordance with the setup mode, no passkey, and a laptop PC. In other words, the PC a changes the SSID to a new SSID for connection operation where "$" indicating the setup mode, "R" indicating no passkey, "N" indicating a laptop PC, and a delimiter, "_" are added to the SSID for normal operation, "FFFFFFFF-xxxxxxxxxxxx." The PC a then connects with the mobile phone c by use of the SSID for connection operation. While the PC a is performing the connection operation with the mobile phone c, the PC b in a state of having been connected with the PC a is disconnected from the PC a since the SSID of the PC a was changed. An SSID for the setup mode is an example of a second access point identifier. Moreover, an SSID for the setup mode is an example of a fourth access point identifier.

Furthermore, after the connection between the PC a and the mobile phone c is established (the setup is complete), the PC a returns from the SSID for connection operation to the SSID for normal operation to perform normal operation. On the other hand, the mobile phone c retrieves the SSID for normal operation from the SSID used by the PC a during connection operation based on the above-described SSID generation logic to perform normal operation, and searches an access point by use of the SSID to establish a connection with the PC a being an access point indicated by the SSID. Moreover, since the PC a returns to the SSID for normal operation, the PC b, which has been disconnected from the PC a, finds the SSID of the PC a through the process of searching an access point to reconnect with the PC a by use of the SSID.

Figure 2:
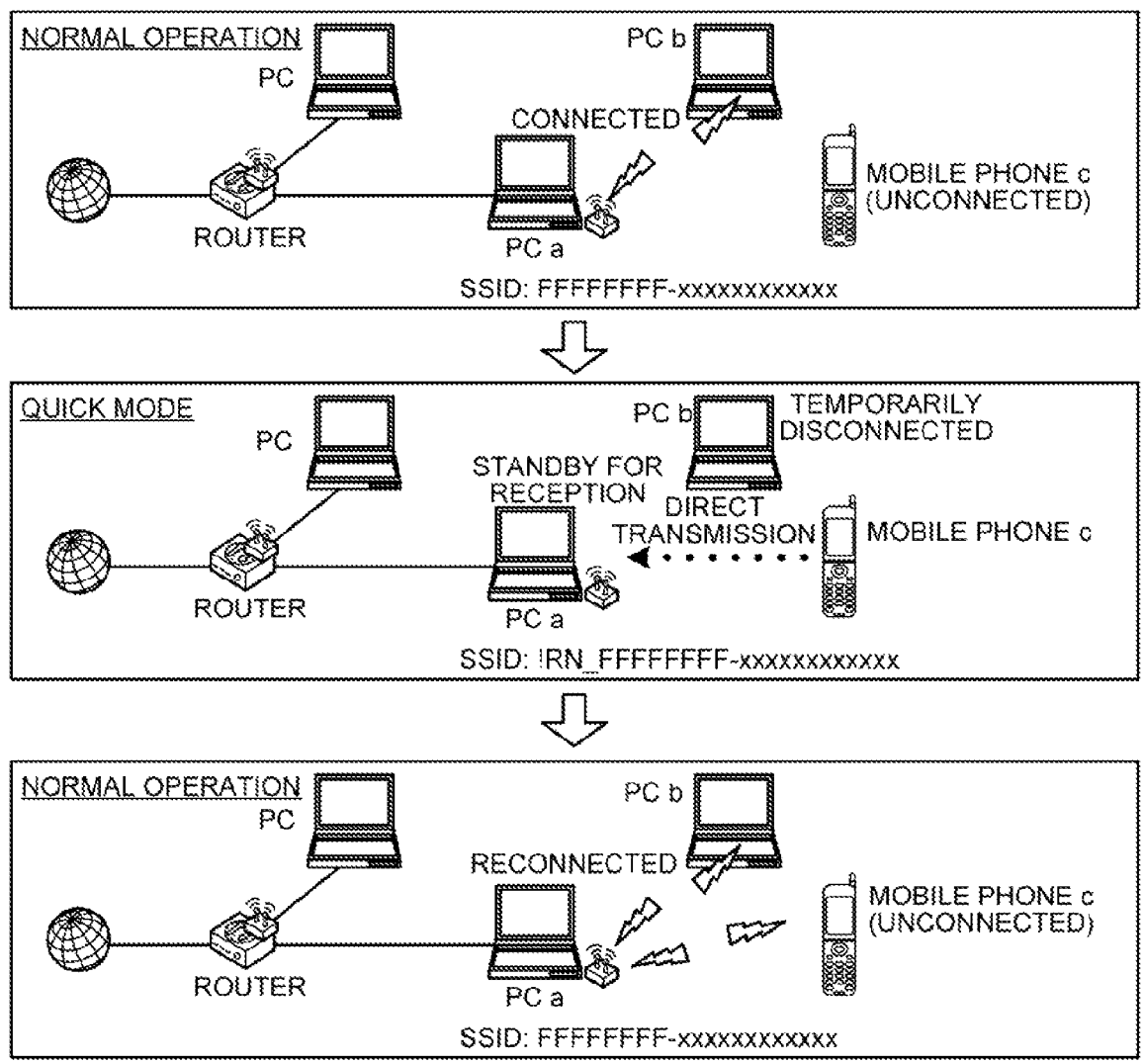
FIG. 2 is an explanatory view of an outline of connection operation in a quick mode.

FIG. 2 is an explanatory view of an outline of connection operation in the quick mode. In the example of FIG. 2, a description will be given of a case where the PC a operates as an access point, and the mobile phone c operates as a station as in FIG. 1. As depicted in FIG. 2, "FFFFFFFF-xxxxxxxxxxxx" is set as an SSID for normal operation in the PC a. Moreover, the PC a is categorized as a laptop PC.

Under such a condition, the PC b sets the SSID for normal operation to connect with the PC a being an access point. At this time, the mobile phone c being a station is assumed to be in a state unconnected with the PC a.

The mobile phone c then attempts to connect with the PC a being an access point in the quick mode. At this time, the PC a being an access point adds to the SSID for normal operation an identifier in accordance with the network construction process, the presence or absence of a passkey and the category of the device itself. Here, the PC a adds to the SSID for normal operation an identifier in accordance with the quick mode, no passkey, and a laptop PC. In other words, the PC a changes the SSID to a new SSID for quick mode where "!" indicating the quick mode, "R" indicating no passkey, "N" indicating a laptop PC, and a delimiter, "_" are added to the SSID for normal operation, "FFFFFFFF-xxxxxxxxxxxx". The PC a then performs the operation of connection with the mobile phone c by use of the SSID for the quick mode, and receives data transmitted from the mobile phone c after the connection is established. While the PC a is performing the connection operation with and receiving data from the mobile phone c, the PC b in a state connected with the PC a is disconnected from the PC a since the SSID of the PC a has been changed. The SSID for the quick mode is an example of a second access point identifier. Moreover, the SSID for the quick mode is an example of a fourth access point identifier.

Furthermore, after the PC a receives the data transmitted from the mobile phone c, the PC a returns from the SSID for the quick mode to the SSID for the normal operation to return to a state before the quick mode. The mobile phone b then disconnects the communication with the PC a. Therefore, the PC b, which has been disconnected from the PC a, finds the SSID of the PC a through the process of searching an access point to reconnect with the PC a by use of the SSID.

Configuration of PC—Mobile Phone Link System According to Embodiment

Figure 3:
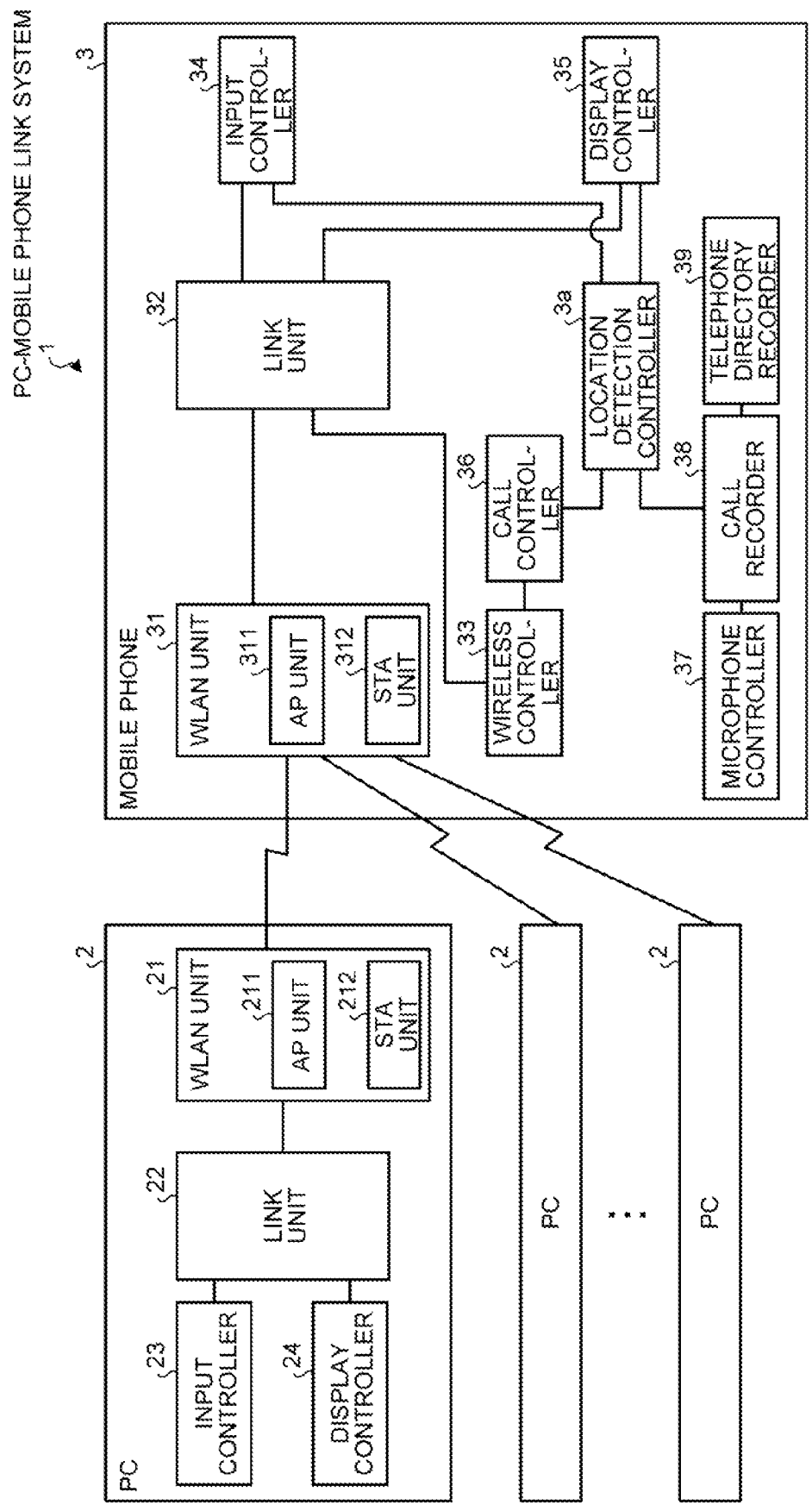
FIG. 3 is a functional block diagram illustrating a configuration of a PC-mobile phone link system according to an embodiment.

Next, a description will be given of a configuration of a PC-mobile phone link system 1 according to the embodiment. FIG. 3 is a functional block diagram of a configuration of the PC-mobile phone link system 1 according to the embodiment. As depicted in FIG. 3, the PC-mobile phone link system 1 includes n number of PCs 2 and one mobile phone 3, and links between the n number of PCs 2 and the one mobile phone 3. Here, "linking" indicates to mutually exchange data such as pictures and moving images.

Each of the PCs 2 includes a WLAN unit 21, a link unit 22, an input controller 23, and a display controller 24. The n number of PCs 2 has these units respectively.

The WLAN unit 21 communicates by a wireless LAN, and here communicates with a WLAN unit 31 of the mobile phone 3. The WLAN unit 21 has an AP unit 211 for causing the WLAN unit 21 to function as an access point in wireless LAN communication and an STA unit 212 for causing the WLAN unit 21 to function as a station (client device) in wireless LAN communication.

The link unit 22 links with another information communication device by use of the WLAN unit 21, and here, links with a link unit 32 of the mobile phone 3. The details of the link unit 22 will be described later.

The input controller 23 accepts data that the user inputs with an input device such as a mouse and a keyboard to pass the accepted data to the link unit 22. The display controller 24 displays the data outputted by the link unit 22 on a display device.

The mobile phone 3 includes the WLAN unit 31, the link unit 32, a wireless controller 33, an input controller 34, a display controller 35, a call controller 36, a microphone controller 37, a call recorder 38, a telephone directory recorder 39, and a location detection controller 3a.

The WLAN unit 31 communicates by a wireless LAN, and here, communicates with the WLAN units 21 of the n number of PCs 2. The WLAN unit 31 has an AP unit 311 for causing the WLAN unit 31 to function as an access point in wireless LAN communication and an STA unit 312 for causing the WLAN unit 31 to function as a station (client device) in wireless LAN communication.

The link unit 32 links with another information communication device by use of the WLAN unit 31, and here, links with the link units 22 of the n number of PCs 2. The details of the link unit 32 will be described later.

The wireless controller 33 performs audio communication and data communication by radio with, for example, another mobile phone, a fixed-line phone, and a computer installed by a mobile phone service provider. The input controller 34 accepts data that the user inputs with an input device such as a button to pass the accepted data to the link unit 32. The display controller 35 displays the data outputted by the link unit 32 on a display device.

The call controller 36 controls, for example, the connection, release, and monitoring of a call. The microphone controller 37 controls a microphone used for a call, and the call recorder 38 records a call. The telephone directory recorder 39 manages a telephone directory, and the location detection controller 3a exerts control over the detection of the location of the mobile phone 3.

Configuration of Link Unit

Figure 4:
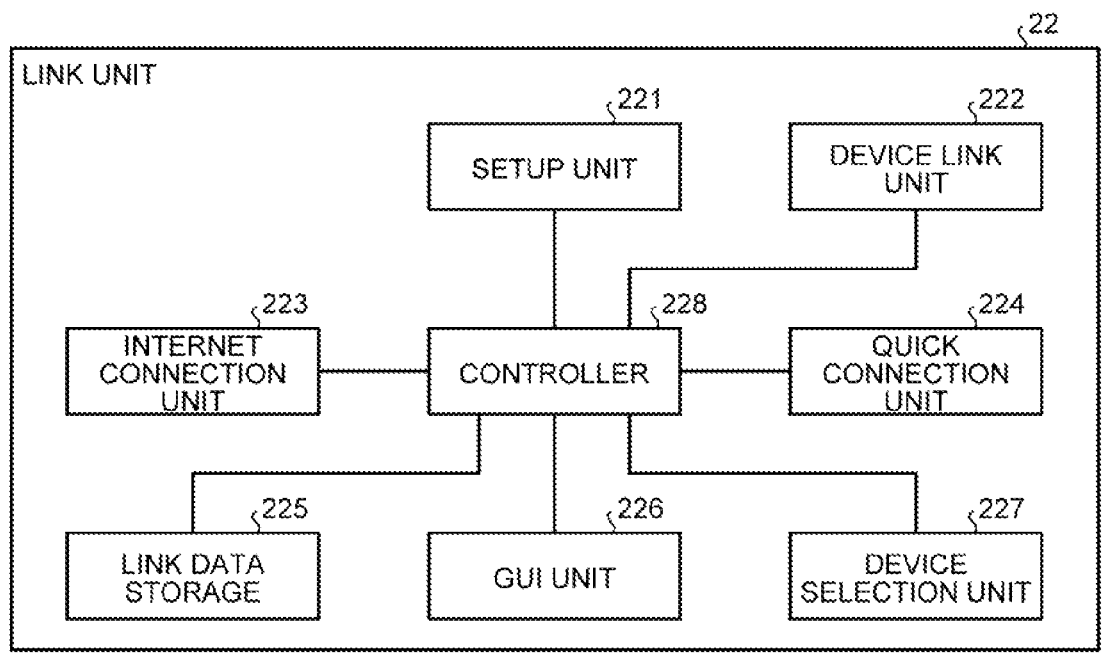
FIG. 4 is a functional block diagram illustrating a configuration of a link unit.

Next, a description will be given of configurations of the link units 22 and 32. The link unit 32 has a similar configuration to that of the link unit 22; accordingly, a description will be given here taking the link unit 22 as an example. In other words, a description will be given taking a case where the link unit 22 of the PC 2 links with the mobile phone 3 as another information communication device as an example. FIG. 4 is a functional block diagram of a configuration of the link unit 22.

As depicted in FIG. 4, the link unit 22 has a setup unit 221, a device link unit 222, an Internet connection unit 223, a quick connection unit 224, a link data storage 225, a GUI unit 226, a device selection unit 227, and a controller 228.

The setup unit 221 performs mutual authentication and registration with another information communication device that has not been authenticated and registered, and here, performs mutual authentication and registration with the mobile phone 3. The details of the setup unit 221 will be described later.

The device link unit 222 links with an information communication device that has mutually been authenticated and registered, and here links with the mobile phone 3. The details of the device link unit 222 will be described later.

The Internet connection unit 223 enables access to the Internet using 3G communication (third generation communication) from an information communication device that is not connected to a network in cooperation with another information communication device in a linkable state. Here, the Internet connection unit 223 connects the PC 2 to the Internet by use of a 3G communication function that the mobile phone 3 has in a case where the PC 2 is not connected to a network, such as outdoors. The details of the Internet connection unit 223 will be described later.

The quick connection unit 224 temporarily links with another information communication device without advance authentication and registration, and here, temporarily links with the mobile phone 3. The details of the quick connection unit 224 will be described later.

The link data storage 225 stores data needed to link with another information communication device, and stores, for example, the SSID for the case where the device itself operates as an AP, an SSID of another information communication device that has mutually been authenticated and registered, an encryption key, device information, and setting information. Here, the link data storage 225 stores the SSID for the case where the PC 2 operates as, for example, an AP, the SSID of the mobile phone 3, an encryption key, device information, and setting information. If there is a plurality of information communication devices that have mutually been authenticated and registered, the link data storage 225 stores, for example, SSIDs, device information, an encryption key, and setting information for each information communication device. Moreover, the details of an SSID will be described later.

The GUI unit 226 interacts with the user by a GUI (Graphical User Interface). Here, the GUI unit 226 receives data inputted by the user from the input controller 23 to pass the data to the controller 228, and receives display data from the controller 228 to pass the display data to the display controller 24.

If there is a plurality of other information communication devices that have mutually been authenticated and registered, the device selection unit 227 displays information on the plurality of devices to cause the user to select a link target device. In the PC-mobile phone link system 1, even if a plurality of mobile phones 3 has been authenticated and registered in a linkable manner, the number of mobile phones 3 with which the PC 2 can simultaneously connect is one so as to prevent an unintended link between the mobile phone 3 and the PC 2. In other words, the communication between the PC 2 and the mobile phone 3 is performed one to one. Therefore, if the PC 2 links with a plurality of mobile phones 3, the PC 2 selects the mobile phones 3 in turn to link with each mobile phone 3. Similarly, if the mobile phone 3 links with a plurality of PCs 2, the mobile phone 3 selects the PCs 2 in turn to link with each PC 2.

The controller 228 controls the entire link unit 22, or specifically, performs things such as moving the control between the function units and passing data between the function unit and the storage to cause the whole to function as the link unit 22.

Example of Data Structure of SSID

Next, a description will be given of the details of an SSID with reference to FIGS. 5A to 5F. In FIGS. 5A to 5F, a "PC-NB" denotes a laptop-type personal computer, and a "PC-DT" denotes a desktop-type personal computer.

FIG. 5A is an explanatory illustration of a data structure of an SSID at the time of shipping a device. An SSID at the time of shipping a device has a 1- to 15-character device name, "_" (underscore), and a 12-character MAC address in any of a PC-NB, a PC-DT, and a mobile phone, and the total number of characters is 14 to 28.

FIG. 5B is an exemplary illustration of a data structure of an SSID after being changed by the user. The SSID after being changed by the user is an ASCII character string unique to the user, the string having 1 to 28 characters, in any of a PC-NB, a PC-DT, and a mobile phone.

FIG. 5C is an exemplary illustration of a data structure of a setup-mode SSID (without a passkey). The SSID (without a passkey) for the setup mode is one where "$RN", "$RD" or "$RM" and "_" (underscore) are added to the head of the SSID for normal operation. "$RN" is added in a case of a PC-NB, "$RD" in a case of a PC-DT, and "$RM" in a case of a mobile phone. "$" indicates that an information communication device operating as an access point is in the setup mode, "R" without a passkey, "N" a laptop-type personal computer, "D" a desktop-type personal computer, and "M" a mobile phone. Four characters are added to the head of the SSID for normal operation; accordingly, the total number of characters is 5 to 32.

FIG. 5D is an exemplary illustration of a data structure of a setup-mode SSID (with a passkey). The SSID (with a passkey) for the setup mode is one where "$FN", "$FD" or "$FM" and "_" (underscore) are added to the head of the SSID for normal operation. "$FN" is added in a case of a PC-NB, "$FD" in a case of a PC-DT, and "$FM" in a case of a mobile phone. "F" indicates with a passkey. Four characters are added to the head of the SSID for normal operation; accordingly, the total number of characters is 5 to 32.

FIG. 5E is an exemplary illustration of a data structure of a quick-mode SSID (without a passkey). The SSID (without a passkey) for the quick mode is one where "!RN", "!RD" or "!RM" and "_" (underscore) are added to the head of the SSID for normal operation. "!RN" is added in a case of a PC-NB, "!RD" in a case of a PC-DT, and "!RM" in a case of a mobile phone. "!" indicates that an information communication device operating as an access point is in the quick mode. Four characters are added to the head of the SSID for normal operation; accordingly, the total number of characters is 5 to 32.

FIG. 5F is an exemplary illustration of a data structure of a quick-mode SSID (with a passkey). The SSID (with a passkey) for the quick mode is one where "!FN", "!FD" or "!FM" and "_" (underscore) are added to the head of the SSID for normal operation. "!FN" is added in a case of a PC-NB, "!FD" in a case of a PC-DT, and "!FM" in a case of a mobile phone. Four characters are added to the head of the SSID for normal operation; accordingly, the total number of characters is 5 to 32.

Processing Sequence in Setup Mode

Figure 6A:
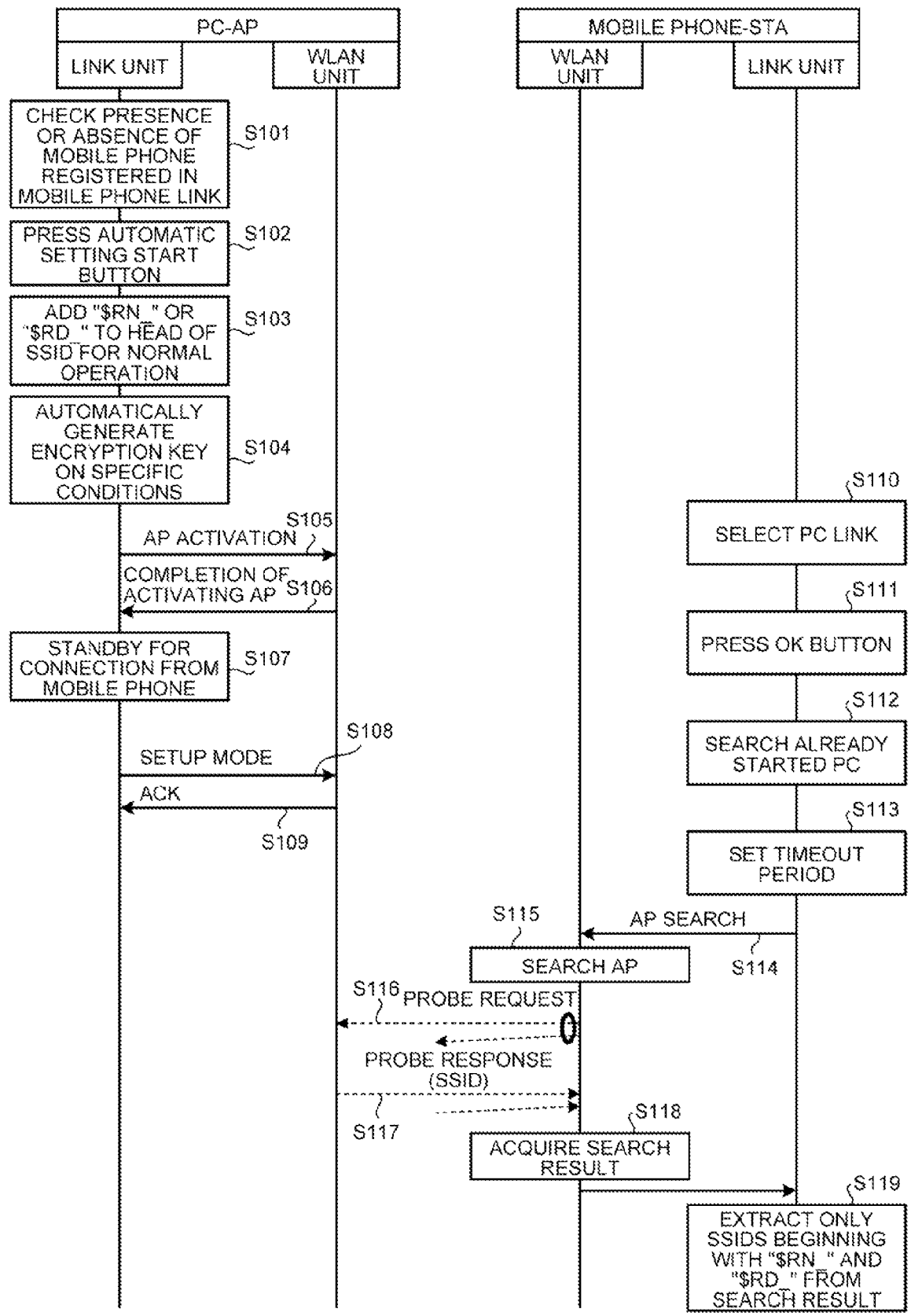
FIG. 6A illustrates a processing sequence in the setup mode according to the embodiment.
Figure 6B:
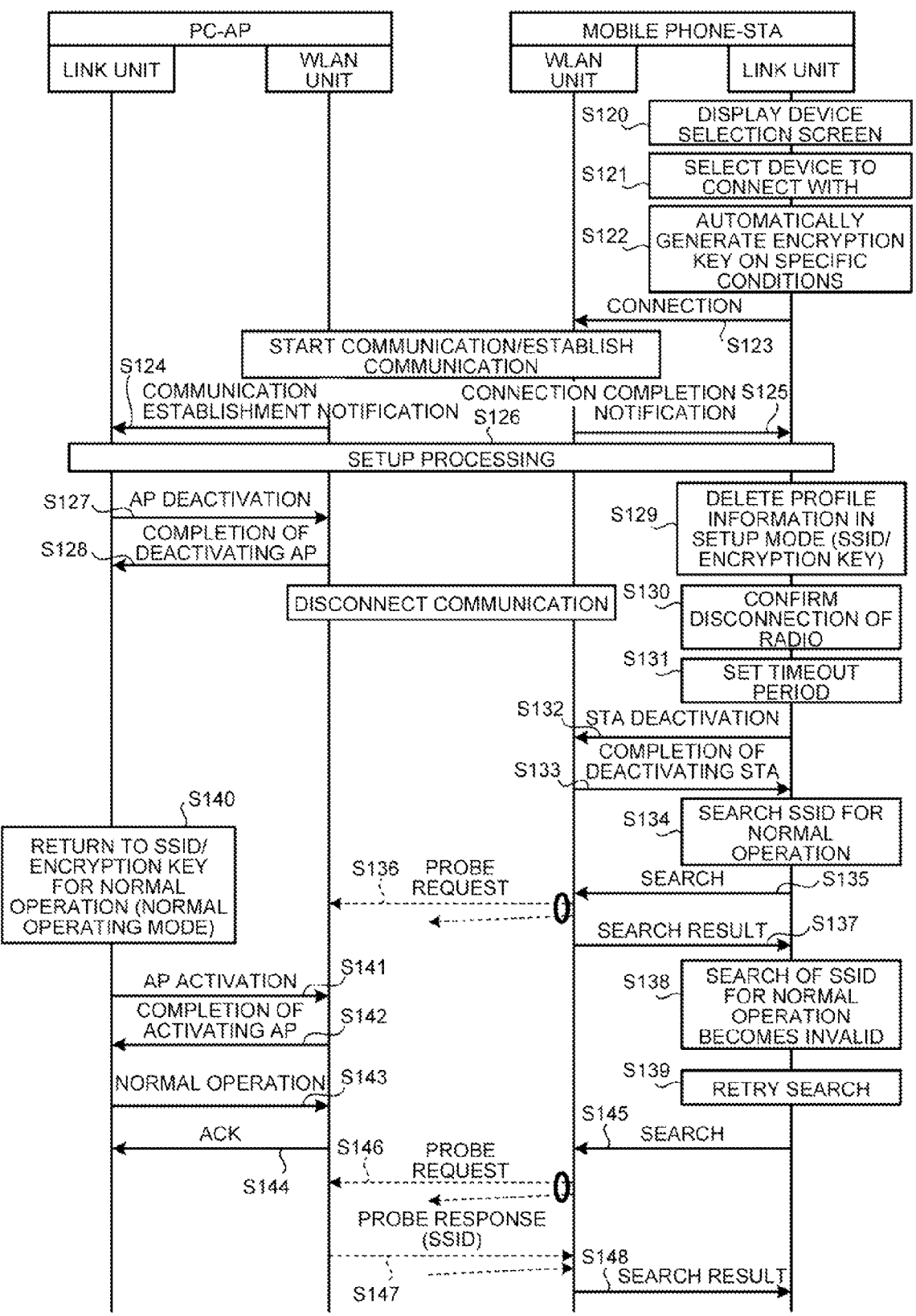
FIG. 6B illustrates the processing sequence in the setup mode according to the embodiment.
Figure 7A:
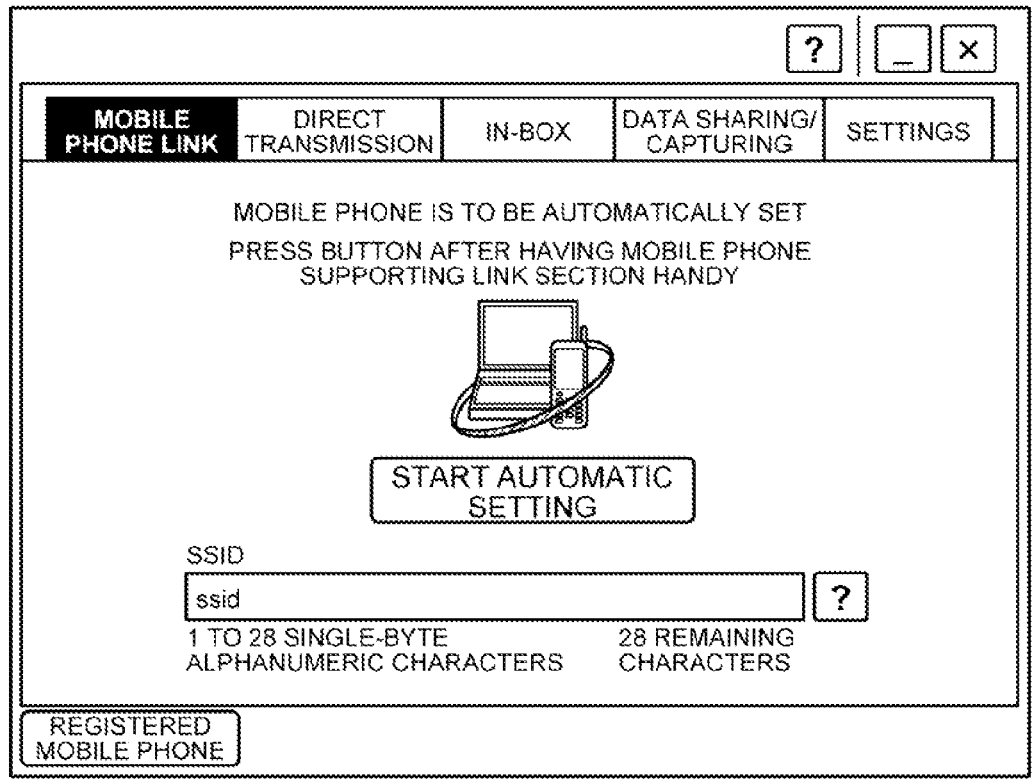
FIG. 7A is an exemplary illustration of a mobile phone link selection screen.

Next, a description will be given of processing in the setup mode between the setup unit 221 of the PC 2 and a setup unit of the mobile phone 3. The setup unit of the mobile phone 3 is set in the following to be a setup unit 321 corresponding to the setup unit 221. Moreover, a link data storage of the mobile phone 3 is set to be a link data storage 325 corresponding to the link data storage 225. FIGS. 6A to 6C illustrate a processing sequence in the setup mode between the setup unit 221 of the PC 2 and the setup unit 321 of the mobile phone 3. It is assumed in FIGS. 6A to 6C that authentication and registration have not yet been mutually performed between the PC 2 and the mobile phone 3, and a mobile phone link is selected by the user in the PC 2, and a mobile phone link selection screen depicted in FIG. 7A is displayed on the screen of the PC 2. Moreover, with regard to the mobile phone 3 to link with, it is assumed that the user turns on the mobile phone 3 and that a personal computer link selection screen depicted in FIG. 7C is displayed on the screen of the mobile phone 3. Moreover, wireless communication between the PC 2 and the mobile phone 3 is performed via the WLAN units 21 and 31.

Firstly, the setup unit 221 of the PC 2 checks the presence or absence of mobile phones registered by the mobile phone link (Step S101). Here, a description will be given of a case where a mobile phone has not been registered. When the user presses an automatic setting start button with an input device (Step S102), the setup unit 221 starts the setup mode.

The setup unit 221 of the PC 2 thereupon adds "$RN" or "$RD" to the head of the SSID for normal operation to generate a new SSID, namely a setup-mode SSID (Step S103). In other words, the setup unit 221 adds "$RN" in a case where the PC 2 is a PC-NB and "$RD" in a case where the PC 2 is a PC-DT to generate the setup-mode SSID. The SSID for normal operation is preset at the time of shipping;

however, the SSID is changeable to an SSID at the user's discretion from the mobile phone link selection screen to be described later.

Next, the setup unit 221 of the PC 2 automatically generates an encryption key with the setup-mode SSID on specific conditions (Step S104). The setup unit 221 then requests the WLAN unit 21 to activate the AP unit 211 (indicated as AP in FIGS. 6A and 6B) (Step S105). Here, as an example of the AP unit 211, SoftAP conducting itself as an access point (AP) of a wireless LAN in conformity with IEEE 802.11 may be adopted. SoftAP implements the function as an AP with software.

The WLAN unit 21 that has been requested to activate the AP unit 211 then activates the AP unit 211 (indicated as AP in FIG. 6) to notify the setup unit 221 of the completion of activating the AP unit 211 (Step S106). The setup unit 221 thereupon displays a screen indicating standby state for a connection from the mobile phone 3 (Step S107). At this time, the setup unit 221 notifies the AP unit 211 to execute the setup mode (Step S108) and receives an ACK (ACKnowledgement) from the AP unit 211 (Step S109).

On the other hand, when the user selects a personal computer link with an input device (Step S110), the setup unit 321 of the mobile phone 3 displays a personal computer link start screen prompting an automatic connection of the mobile phone link from the PC 2 side. At this time, the setup unit 321 instructs the WLAN unit 31 to activate the STA unit 312. When the user of the PC 2 presses an OK button with an input device (Step S111), the setup unit 321 then starts a search for already-started PCs to start the setup mode (Step S112).

The setup unit 321 of the mobile phone 3 then sets a timeout period and instructs the WLAN unit 31 to search a PC that has already been started and operates as an AP (Steps S113 and S114). The WLAN unit 31 executes the search after receiving the instruction from the setup unit 321 (Step S115). In other words, the STA unit 312 of the WLAN unit 31 transmits a Probe request (Step S116), and in this example, receives a Probe response from the PC 2 to operate as an AP (Step S117). A PC operating as an AP is also referred to as a PC-AP in the following description. Here, if there exist other APs in operation (including other PC-APs, mobile phones to operate as APs, and AP-specific devices other than these, and routers having an AP function) within the search range, the STA unit 312 of the WLAN unit 31 receives Probe responses from those APs. In this manner, the STA unit 312 acquires a search result (Step S118). In short, the STA unit 312 may acquire one SSID or a plurality of SSIDs as a search result. Whenever receiving a Probe response, the STA unit 312 of the WLAN unit 31 informs the setup unit 321 of a search result.

The setup unit 321 then extracts a setup-mode SSID(s) beginning with "$RN" or "$RD" from the search result acquired from the STA unit 312 of the WLAN unit 31 within the above set timeout period (Step S119). In other words, the setup unit 321 extracts only a PC-AP(s) being in the setup mode.

The setup unit 321 of the mobile phone 3 then displays a device selection screen indicating an extracted PC-AP(s) (a device(s) with a possibility of connection to the mobile phone 3) (Step S120). If there is a plurality of PC-APs, the setup unit 321 selects a device (PC-AP) to connect with based on the user's instruction on the device selection screen by an input device (Step S121). If only one PC-AP is extracted, the setup unit 321 selects the PC-AP.

Next, the setup unit 321 of the mobile phone 3 automatically generates an encryption key with the setup-mode SSID of the selected device on specific conditions (Step S122). The specific conditions are the same algorithm as that of the specific conditions used when automatically generating the encryption key in the PC 2. The setup unit 321 then holds on a link data storage 326 the setup-mode SSID, the automatically generated encryption key, device information (profile information) in the setup mode of the selected device.

The setup unit 321 of the mobile phone 3 then informs a connection request to which the generated encryption key is added and to be in the setup mode to the PC 2 through the WLAN unit 31 (Step S123). The WLAN unit 31 of the mobile phone 3 and the WLAN unit 21 of the PC 2 thereupon start communication, perform authentication with the encryption key, and establish communication after being authenticated. The WLAN unit 21 of the PC 2 then informs the setup unit 221 of the establishment of communication (Step S124). Moreover, the WLAN unit 31 of the mobile phone 3 informs the setup unit 321 of the establishment of communication (Step S125). Accordingly, the authentication between the PC 2 and the mobile phone 3 has been made.

If the authentication has been made between the PC 2 and the mobile phone 3, the setup unit 321 of the mobile phone 3 and the setup unit 221 of the PC 2 authenticate and register each other (Step S126). As a result of the authentication and registration, the setup unit 321 of the mobile phone 3 is to hold on the link data storage 325 the profile information under normal operation of the PC 2 being the party at the other end of a communication channel. The details of the authentication and registration of the setup units 221 and 321 will be described later.

After the authentication and registration, the setup unit 221 of the PC 2 instructs the WLAN unit 21 to deactivate the AP unit 211 (Step S127), and receives a deactivation completion notification from the WLAN unit 21 that has deactivated the AP unit 211 (Step S128). Accordingly, the communication between the PC 2 and the mobile phone 3 is disconnected.

On the other hand, after the authentication and registration, the setup unit 321 of the mobile phone 3 deletes the profile information in the setup mode, the setup-mode SSID and the encryption key (Step S129). The setup unit 321 then confirms the disconnection of radio (Step S130). After confirming the disconnection of radio, the setup unit 321 sets a timeout period for a search process to search the PC 2 (Step S131). The setup unit 321 then deactivates the STA unit 312 through the WLAN unit 31 (Step S132) to receive a deactivation completion notification from the WLAN unit 31 (Step S133).

The setup unit 321 of the mobile phone 3 then conducts a search for the SSID for normal operation of the PC 2 that the mobile phone 3 has authenticated and registered in the above to establish communication with the PC 2 (Step S134). The setup unit 321 instructs the WLAN unit 31 to conduct a search, and the WLAN unit 31 executes a search in accordance with the instruction (Step S135). In other words, the STA unit 312 of the WLAN unit 31 transmits a Probe request (Step S136) and informs the setup unit 321 of a probe response received within a predetermined time as a search result (Step S137). This example shows a case where the AP unit 211 of the PC 2 in the setup mode in the above is not in a normal operation state by the time of the transmission of the probe request. Therefore, here, the setup unit 321 is unable to recognize the relevant SSID for normal operation in the search result received from the STA unit 312 of the WLAN unit 31, and the search for the SSID for normal operation becomes invalid (Step S138). The setup unit 321 determines whether or not the SSID for normal operation being a search target is included in the search result by use of the SSID of the PC 2, which is included in the profile information acquired upon the authentication and registration in Step S126 and stored on the link data storage 325.

On the other hand, in the PC 2, after the communication with the mobile phone 3 is disconnected, a process of shifting the AP unit 211 to a normal operation state is performed independently of the above process of the mobile phone 3. After the deactivation of the AP unit 211 is completed, the setup unit 221 of the PC 2 returns to the SSID for normal operation and the encryption key for normal operation (Step S140). The setup unit 221 then requests the WLAN unit 21 to activate the AP unit 211 (Step S141). The WLAN unit 21, which has been requested to activate the AP unit 211, then activates the AP unit 211 and informs the setup unit 221 of the completion of activating the AP unit 211 (Step S142). The setup unit 221 then instructs the AP unit 211 to execute normal operation (Step S143) to receive an ACK from the AP unit 211, which has turned to normal operation (Step S144).

In response to a fact that the search result is invalid in the above search process, the setup unit 321 of the mobile phone 3 retries a search for the PC with the SSID for normal operation (Step S139). The setup unit 321 instructs the WLAN unit 31 to conduct a search as described above, and the WLAN unit 31 executes a search again in accordance with the instruction (Step S145). In other words, the STA unit 312 of the WLAN unit 31 transmits a Probe request (Step S146). In response to the Probe request, the AP unit 211 of the PC 2 that has turned to normal operation informs a Probe response to the WLAN unit 31 of the mobile phone 3 (Step S147). The Probe response from the AP unit 211 of the PC 2 includes the SSID for normal operation of the PC 2. The STA unit 312 of the WLAN unit 31 informs the setup unit 321 of the Probe response received within the predetermined time as a search result (Step S148). At this time, the search result includes the SSID for normal operation of the PC 2. If the search result obtained through the process of retrying a search is invalid, the process of retrying a search is repeated as long as within the timeout period set in Step S131.

The setup unit 321, which has acquired the search result from the STA unit 312 of the WLAN unit 31, detects the SSID for normal operation from the search result (Step S149). Here, if there is a plurality of the same SSIDs used under normal operation, the setup unit 321 discriminates the PC performing normal operation by use of a MAC address included in the profile information under normal operation.

The setup unit 321 of the mobile phone 3 then informs a connection request to which the encryption key for normal operation is added through the WLAN unit 31 (Step S150). The WLAN unit 31 of the mobile phone 3 and the WLAN unit 21 of the PC 2 then start communication, perform authentication with the encryption key, and establish communication after being authenticated. The WLAN unit 21 of the PC 2 then informs the setup unit 221 of the establishment of communication (Step S151). The setup unit 221 then displays on the PC 2 a screen indicating being in connection by the mobile phone link.

Moreover, the WLAN unit 31 of the mobile phone 3 informs the setup unit 321 of the establishment of communication (Step S152). The setup unit 321 then displays on the mobile phone 3 a screen indicating being in connection by the personal computer link. Accordingly, the PC 2 and the mobile phone 3 have been connected by a network under normal operation.

Example of Screen Used in Processing Sequence in Setup Mode

FIG. 7A is an exemplary illustration of the mobile phone link selection screen. As depicted in FIG. 7A, when mobile phone link is selected in the PC 2, the PC 2 displays the automatic setting start button to automatically perform setup between the PC 2 and the mobile phone 3. Furthermore, the PC 2 displays a text box for changing the SSID for normal operation to the SSID at the user's discretion. In FIG. 7A, the PC 2 is configured so as to be able to set the SSID at the user's discretion.

Figure 7B:
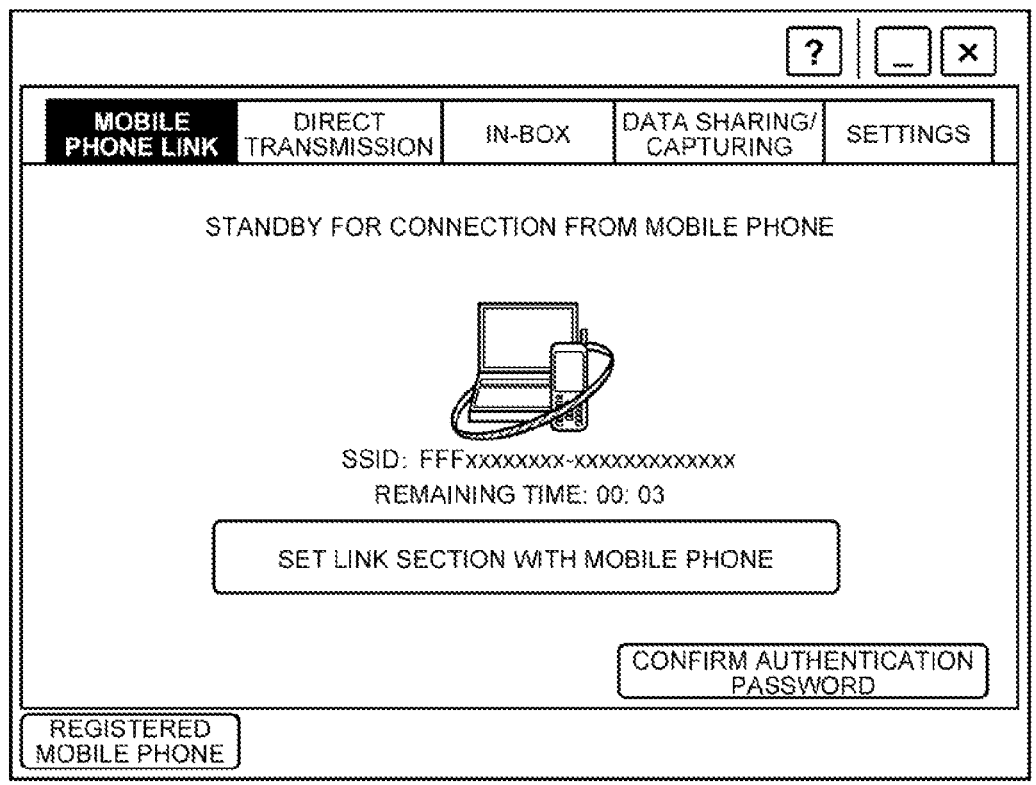
FIG. 7B is an exemplary illustration of a standby screen for a connection from a mobile phone.
Figure 7C:
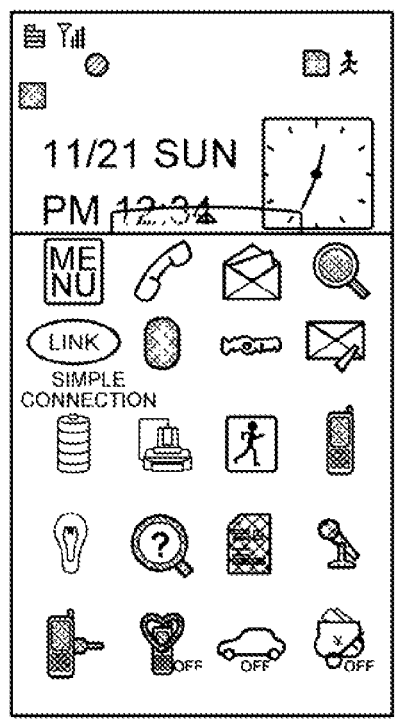
FIG. 7C is an exemplary illustration of a PC link selection screen.

FIG. 7B is an exemplary illustration of a standby screen for a connection from the mobile phone. As depicted in FIG. 7B, for linking with the mobile phone, the PC 2 displays on the PC 2 a message "in a standby state for a connection from the mobile phone", prompting to activate the link unit 32 by the mobile phone 3.

FIG. 7C is an exemplary illustration of a PC link selection screen. As depicted in FIG. 7C, when turning on the mobile phone 3, the mobile phone 3 displays an icon for activating the link unit 32.

Figure 7D:
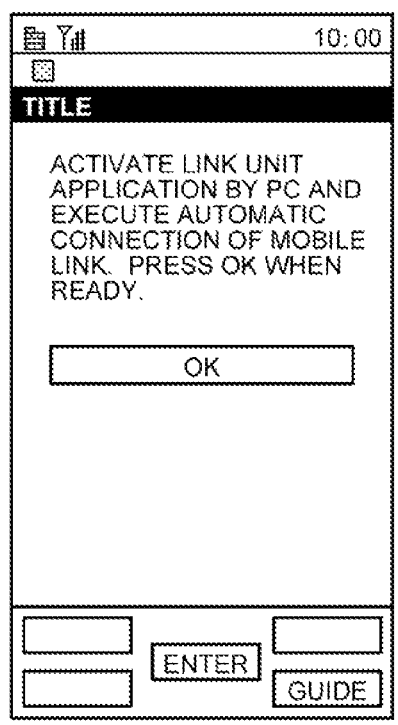
FIG. 7D is an exemplary illustration of a PC link start screen.

FIG. 7D is an exemplary illustration of a PC link start screen. As depicted in FIG. 7D, for linking with the PC, the mobile phone 3 displays a message prompting to activate the link unit 22 by the PC 2 and an OK button to let the user to start the PC link after activating the link unit 22 by the PC 2.

Figure 7E:
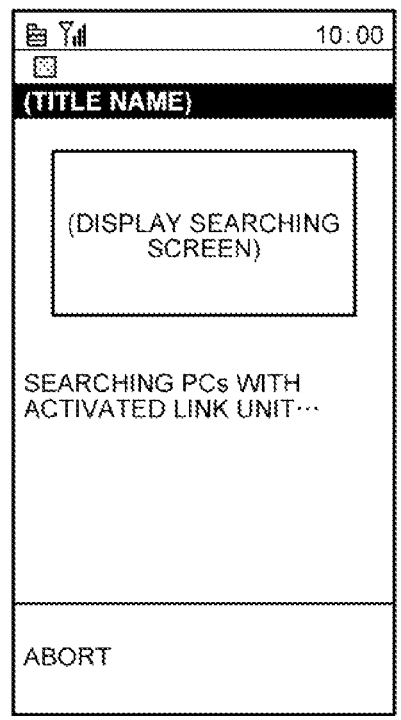
FIG. 7E is an exemplary illustration of a screen for searching an AP.

FIG. 7E is an exemplary illustration of a screen for searching an AP. As depicted in FIG. 7E, the mobile phone 3 displays a searching screen during a search for a PC to operate as an AP.

Figure 7F:
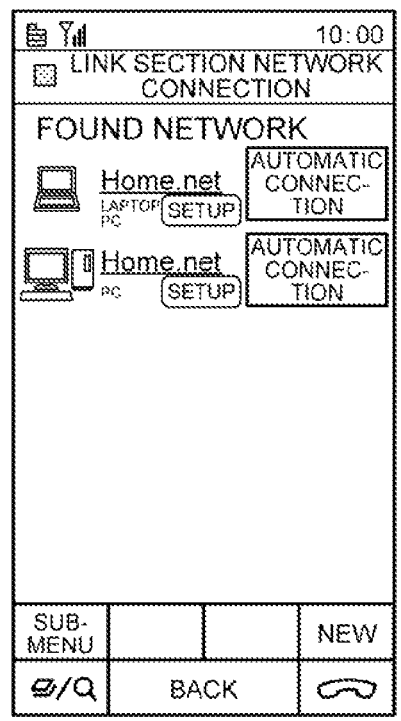
FIG. 7F is an exemplary illustration of a device selection screen.

FIG. 7F is an exemplary illustration of a device selection screen. As depicted in FIG. 7F, after searching a PC to operate as an AP, the mobile phone 3 displays connectable devices being a search result and also displays automatic connection buttons for letting the user to select a device for each device.

Figure 7G:
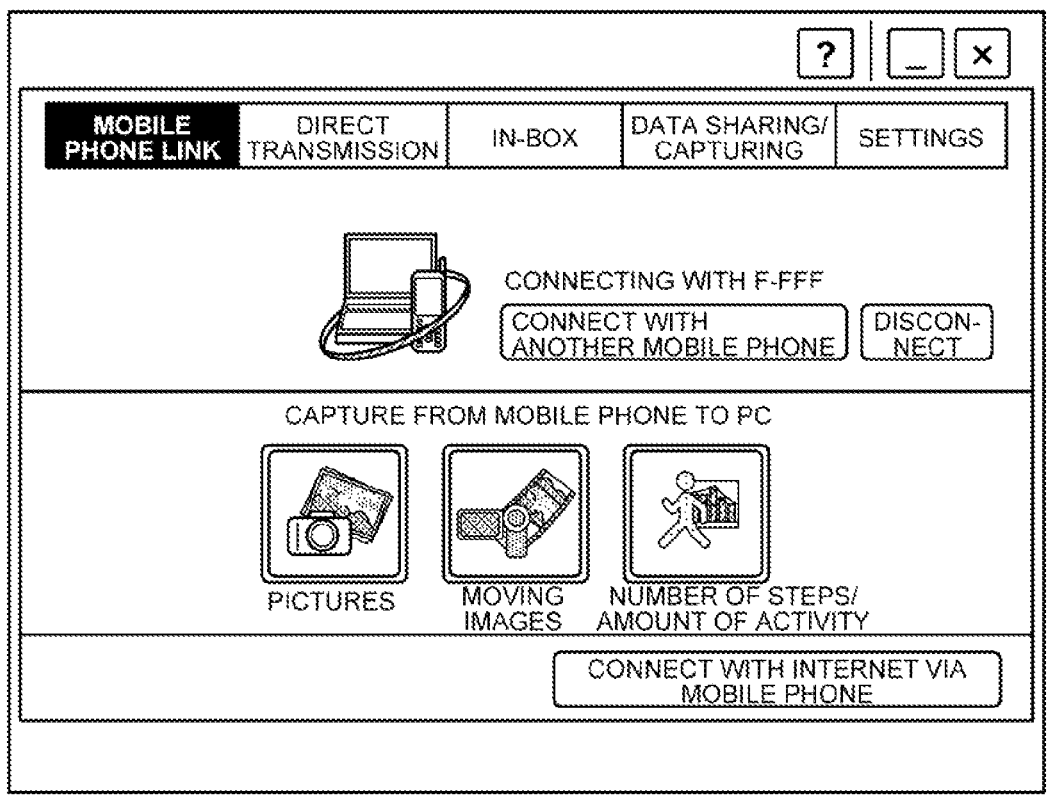
FIG. 7G is an exemplary illustration of a linking-with-mobile phone screen.

FIG. 7G is an exemplary illustration of a linking-with-mobile phone screen. As depicted in FIG. 7G, after returning to the SSID for normal operation and then reestablishing communication with the mobile phone 3, the PC 2 displays a screen indicating being in connection with the mobile phone 3 by the mobile phone link.

Figure 7H:
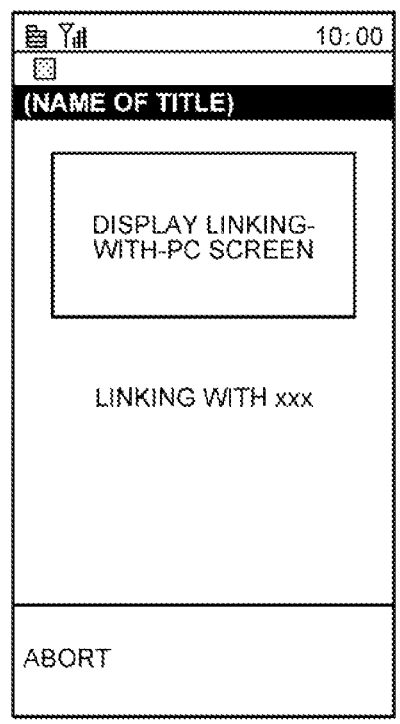
FIG. 7H is an exemplary illustration of a linking-with-PC screen.

FIG. 7H is an exemplary illustration of a linking-with-PC screen. As depicted in FIG. 7H, after reestablishing communication with the PC 2 by the SSID for normal operation, the mobile phone 3 displays a screen indicating being in connection with the PC 2 by the PC link.

Sequence of Setup Process

Next, a description will be given of the sequence of the setup process in S126 in FIG. 6B with reference to FIG. 8. FIG. 8 illustrates a setup sequence. In FIG. 8, a description will be given assuming that the PC 2 operates as an access point (AP) and the mobile phone 3 as a station (STA). Moreover, the PC 2 and the mobile phone 3 are assumed to have established communication by use of the setup-mode SSID and have performed authentication.

As depicted in FIG. 8, the setup unit 321 of the mobile phone 3 transmits a setup (authentication and registration) start request to the PC 2 (Step S201), and when accepting the setup start request, the setup unit 221 of the PC 2 transmits to the mobile phone 3 a setup start response as a response to the setup start request (Step S202).

When receiving the setup start response, the setup unit 321 of the mobile phone 3 transmits to the PC 2 a request to update device information and wireless LAN information (step S203). After receiving the update request and performing preparation for the transmission of the device information and the wireless LAN information, the setup unit 221 of the PC 2 transmits to the mobile phone 3 an update response as a response to the update request (Step S204). When receiving the update response, the setup unit 321 of the mobile phone 3 then transmits to the PC 2 a request to acquire the device information and the wireless LAN information (Step S205).

The setup unit 221 of the PC 2 transmits to the mobile phone 3 the device and wireless LAN information of the device itself as a response to the acquisition request (Step S206). Here, the device information means profile information to be described later. Moreover, the wireless LAN information means information including the SSID for normal operation and the encryption key for normal operation.

The setup unit 321 of the mobile phone 3 then receives the device and wireless LAN information transmitted from the PC 2, transmits to the PC 2 a receipt completion notification to inform that the reception was completed properly (Step S207), and stores the SSID, encryption key, and device information of the PC 2 on the link data storage 325.

The setup unit 221 of the PC 2, which has received the receipt completion notification, transmits to the mobile phone 3 a request to update the device information and the wireless LAN information (step S208). After receiving the update request and performing preparation for the transmission of the device and wireless LAN information of the device itself, the setup unit 321 of the mobile phone 3 transmits to the PC 2 an update response as a response to the update request (Step S209). When receiving the update response, the setup unit 221 of the PC 2 then transmits to the mobile phone 3 a request to acquire the device and wireless LAN information (Step S210). The setup unit 321 of the mobile phone 3 transmits to the PC 2 the device and wireless LAN information in the device itself as a response to the acquisition request (Step S211).

The setup unit 221 of the PC 2 then receives the device and wireless LAN information transmitted from the mobile phone 3, transmits to the mobile phone 3 a receipt completion notification to inform that the reception was completed properly (Step S212), and stores the SSID, encryption key, and device information of the mobile phone 3 on the link data storage 225.

The setup unit 221 of the PC 2 subsequently transmits a setup termination request to the mobile phone 3 (Step S213). The setup unit 321 of the mobile phone 3 receives the setup termination request to transmit to the PC 2 a setup termination response as a response thereto (Step S214). As a result, the mutual setup, namely authentication and registration, between the mobile phone 3 and the PC 2 terminates.

From the start of the setup to the termination of the setup, wireless LAN connectivity may be lost or an unexpected error may occur. In these cases, the setup has not completely terminated; accordingly, it is sufficient if the setup units 221 and 321 destroy the device and wireless LAN information that has received during the setup.

Example of Data Structure of Profile Information

FIG. 9 is an exemplary illustration of a data structure of profile information. As depicted in FIG. 9, the profile information stores a version number, a model, a MAC address, hardware information, an individual function, and a link function. Version information of the link units 22 and 32 in their respective devices is stored in the version number. Category information of the device itself is stored in the model. For example, the discrimination between the laptop-type personal computer, the desktop-type personal computer, and the mobile phone is stored in the model. It is sufficient if a content of the model is determined as appropriate in accordance with the category of the device. MAC address information of the device itself is stored in the MAC address. Information on the number of pixels regarding a liquid crystal display (LCD) and camera information, for example, is stored in the hardware information. The presence or absence of support for WOL (Wake On LAN) is stored in the individual information. Information on the presence or absence of support for the link functions is stored in the link functions. The profile information is stored per device on the link data storages 225 and 325 provided for their respective devices, and is stored, for example, at the time of shipping.

In this manner, the setup unit 221 of the PC 2 and the setup unit 321 of the mobile phone 3 handshake before the transmission and reception of data. In other words, the setup units 221 and 321 mutually register the profile and wireless LAN information of a device at the other end of a communication channel before the transmission and reception of data. Therefore, the setup units 221 and 321 enable a simple connection even if the functions as an AP and a station are interchanged in the future.

In the embodiment, the description was given assuming that the PC 2 is operated as an access point (AP) and the mobile phone 3 as a station (STA). However, the mobile phone 3 may operate as an AP and the PC 2 as an STA.

Moreover, in the embodiment, the mobile phone 3 on the STA side is set to transmit to the PC 2 on the AP side a request to acquire device information and wireless LAN information first. However, the PC 2 on the AP side may transmit to the mobile phone 3 on the STA side a request to acquire device information and wireless LAN information first without being limited to the above.

Sequence of Device Link Connection Processing

Figure 10:
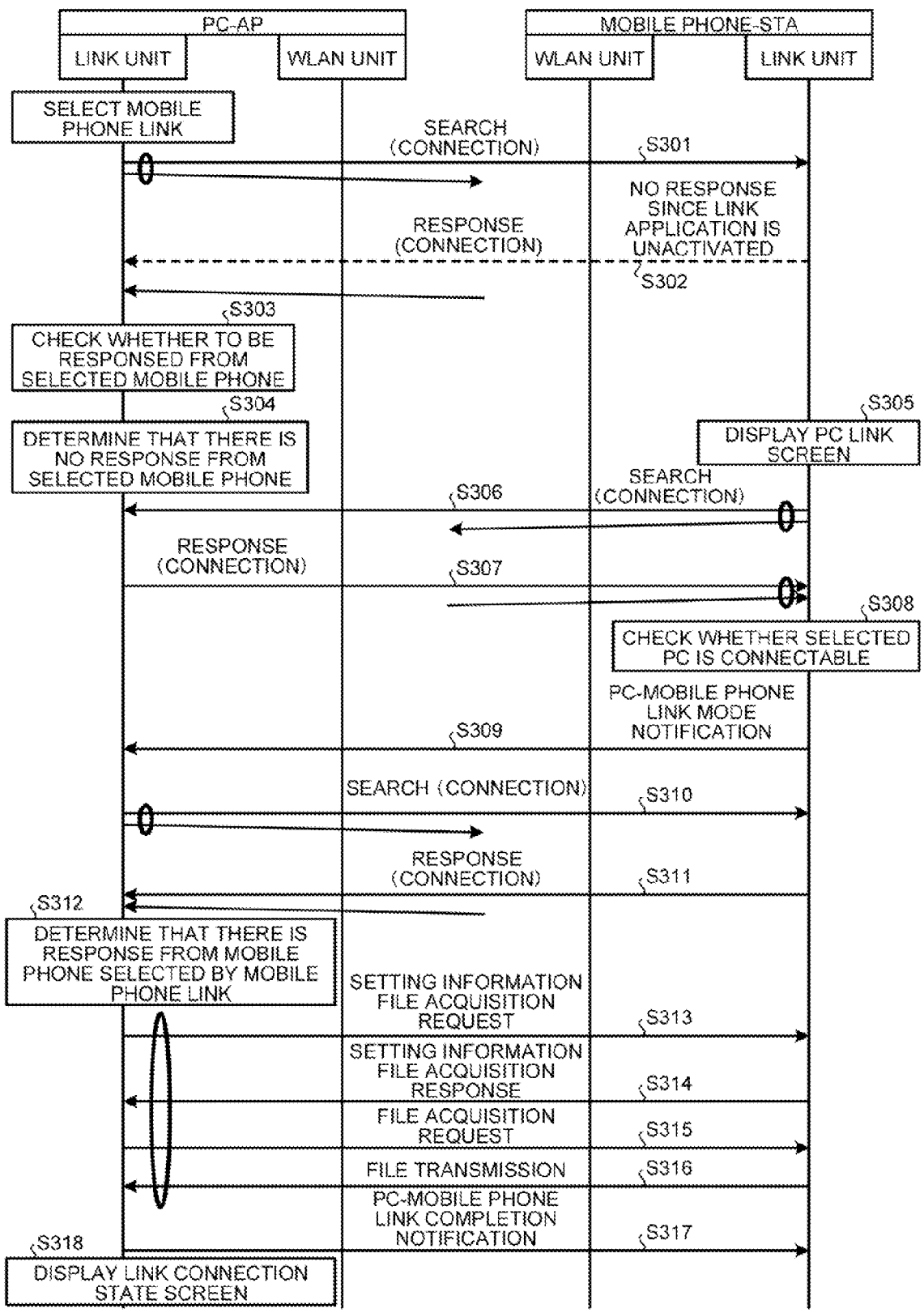
FIG. 10 illustrates a sequence of device link connection processing.

Next, a description will be given of device link connection processing between the device link unit 222 of the PC 2 and a device link unit of the mobile phone 3. The device link unit of the mobile phone 3 is set in the following to be a device link unit 322 corresponding to the device link unit 222 of the PC 2. FIG. 10 illustrates a sequence of device link connection processing between the device link unit 222 of the PC 2 and the device link unit 322 of the mobile phone 3.

Figure 11A:
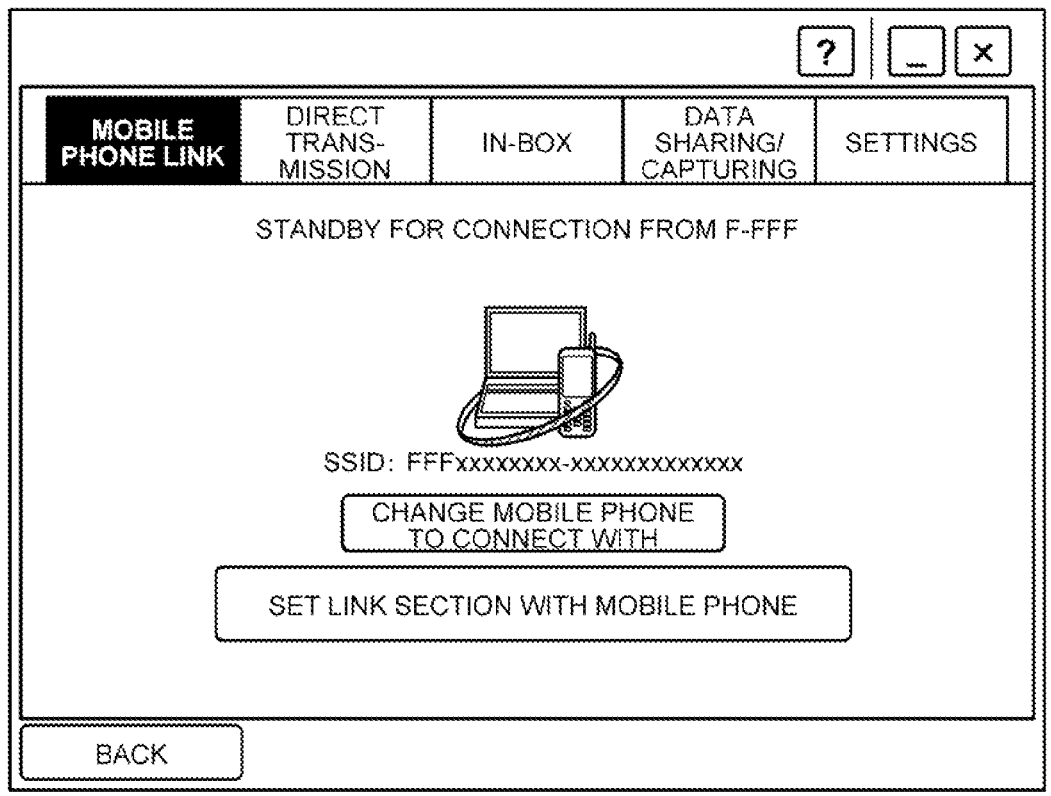
FIG. 11A is an exemplary illustration of a mobile phone link screen.

It is assumed in FIG. 10 that the authentication and registration has mutually been performed between the PC 2 and the mobile phone 3 and that the PC 2 and the mobile phone 3 have selected the mobile phone 3 and the PC 2 to link with, respectively. Moreover, it is assumed that the user has selected a mobile phone link function in the PC 2, and a mobile phone link screen is being displayed on the screen of the PC 2. FIG. 11A is an exemplary illustration of the mobile phone link screen. As depicted in FIG. 11A, for example, the SSID of the mobile phone 3 is displayed on the mobile phone link screen. Immediately after the activation of the mobile phone link screen (the device link unit 222), the SSID of the mobile phone 3 that connected in the previous execution of the mobile phone link function is displayed. In other words, when the link function is executed, the mobile phone link function works to store on the link data storage 225 information indicating a device at the other end to have connected with by the execution, reads the information from the link data storage 225 upon next activation, and displays information of the mobile phone 3 indicated by the information on the mobile phone link screen. Moreover, after the mobile phone link screen (the device link unit 222) is activated, the sequence of device link connection processing (Step S301) in FIG. 10 starts being executed, setting the mobile phone 3 displayed on the mobile phone link screen as a link target device. The user may change the mobile phone 3 to connect with from this screen to execute the mobile phone link processing. Here, it is assumed that the link unit 32 is unactivated in the mobile phone 3 to link with. Wireless communication between the PC 2 and the mobile phone 3 is effected through the WLAN units 21 and 31.

As depicted in FIG. 10, the device link unit 222 searches the selected mobile phone 3 to connect with (Step S301). At this point, the link unit 32 of the mobile phone 3 is unactivated; accordingly, there is no response (Step S302) that is transmitted from the mobile phone 3 if the link unit 32 has been activated. Moreover, if there is a response, the device link unit 222 checks whether or not the response is from the mobile phone 3 selected in the mobile phone link (Step S303). As a result, the device link unit 222 determines at this point that there is no response from the mobile phone 3 selected in the mobile phone link (Step S304). It is sufficient as long as the device link unit 222 is set to start the search process in Step S301 in the sequence, using the PC 2's resumption from a standby state such as a sleep state and a hibernate state and startup from a shutdown state as a trigger. Moreover, it is sufficient as long as the PC 2 is resumed and started based on, for example, the user's manual operation of a power button of the PC 2 and a remote instruction (transmission message) by the mobile phone 3 via a network.

Figure 11B:
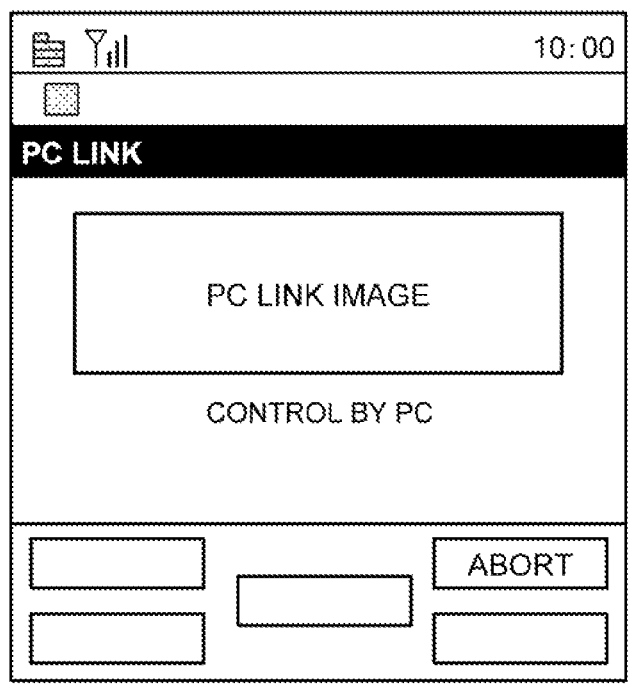
FIG. 11B is an exemplary illustration of a PC link screen.

The link unit 32 is activated in the mobile phone 3 afterward, and when the user selects the PC link, the device link unit 322 displays a PC link screen (Step S305). Upon activation of the PC link screen (the device link unit 322), the SSID of the PC 2 that connected in the previous execution of a PC link function is displayed on the mobile phone 3, too, similarly to the PC 2. In other words, when the link function is executed, the PC link function stores on the link data storage 325 information indicating a device at the other end to have connected with by the execution, reads the information from the link data storage 325 upon next activation, and displays information of the PC 2 indicated by the information on the PC link screen. Moreover, after the PC link screen (the device link unit 322) is activated, the sequence of device link connection processing (Step S305) in FIG. 10 starts being executed, setting the PC 2 displayed on the PC link screen as a link target device. FIG. 11B is an exemplary illustration of the PC link screen. As depicted in FIG. 11B, the mobile phone 3 displays that the PC link function is operating. Moreover, the user may change the PC 2 to connect with from this screen to execute the PC link processing.

The device link unit 322 searches the PC 2 (Step S306). The device link unit 222 of the PC 2 responds to the search conducted by the device link unit 322 of the mobile phone 3 (Step S307). The device link unit 322 of the mobile phone 3 checks with, for example, MAC addresses whether to be connectable to the selected PC 2 based on the response from the PC 2 (Step S308). This check is carried out by comparing the MAC address of the PC 2 included in the response and the MAC address included in the profile information that have already been acquired in the setup process, and in the case where they agree with each other, it is determined to be connectable. As a result, if the selected PC 2 is connectable, the device link unit 322 transmits a PC-mobile phone link mode notification to the selected PC 2 (Step S309). On the other hand, in the case where the selected PC 2 is not connectable, the device link unit 322 does not transmit a PC-mobile phone link mode notification.

The device link unit 222 of the PC 2 then searches the mobile phone 3 to connect with the selected mobile phone 3 (Step S310). The link unit 32 of the mobile phone 3 has been activated. The device link unit 322 of the mobile phone 3 determines whether or not the information included in the search agrees with the profile information that has already been acquired in the setup process, and responds to the search when these pieces of information agree with each other as the result (Step S311). The device link unit 222 of the PC 2 determines that there is a response from the mobile phone 2 selected in the mobile phone link (Step S312).

When there is a response from the mobile phone 2 selected in the mobile phone link, the device link unit 222 of the PC 2 then transmits a request to acquire a setting information file to the mobile phone 3 (Step S313). The details will be described later; however, the setting information file includes information indicating the settings to be valid/invalid for the respective link functions in the mobile phone 3. After receiving the setting information file acquisition request and performing preparation for the transmission of the setting information file, the device link unit 322 of the mobile phone 3 transmits a setting information file acquisition response to the setting information file acquisition request from the device link unit 222 of the PC 2 (Step S314). On the receipt of the setting information file acquisition response, the device link unit 222 of the PC 2 then transmits to the mobile phone 3 a file acquisition request for the setting information file (Step S315). The device link unit 322 of the mobile phone 3 transmits the setting information file to the PC 2 in response to the file acquisition request (Step S316). The device link unit 222 of the PC 2 receives the setting information file transmitted from the mobile phone 3, transmits to the mobile phone 3 a PC-mobile phone link completion notification to inform that the reception was completed properly (Step S317), and displays a screen indicating a link connection state on the PC 2 (Step S318). The process is subsequently performed in accordance with the valid or invalid settings of the link functions on the mobile phone 3 side included in the setting information file, and the device link unit 222 of the PC 2 can capture data from the mobile phone 3 based on the user's instruction.

Figure 11C:
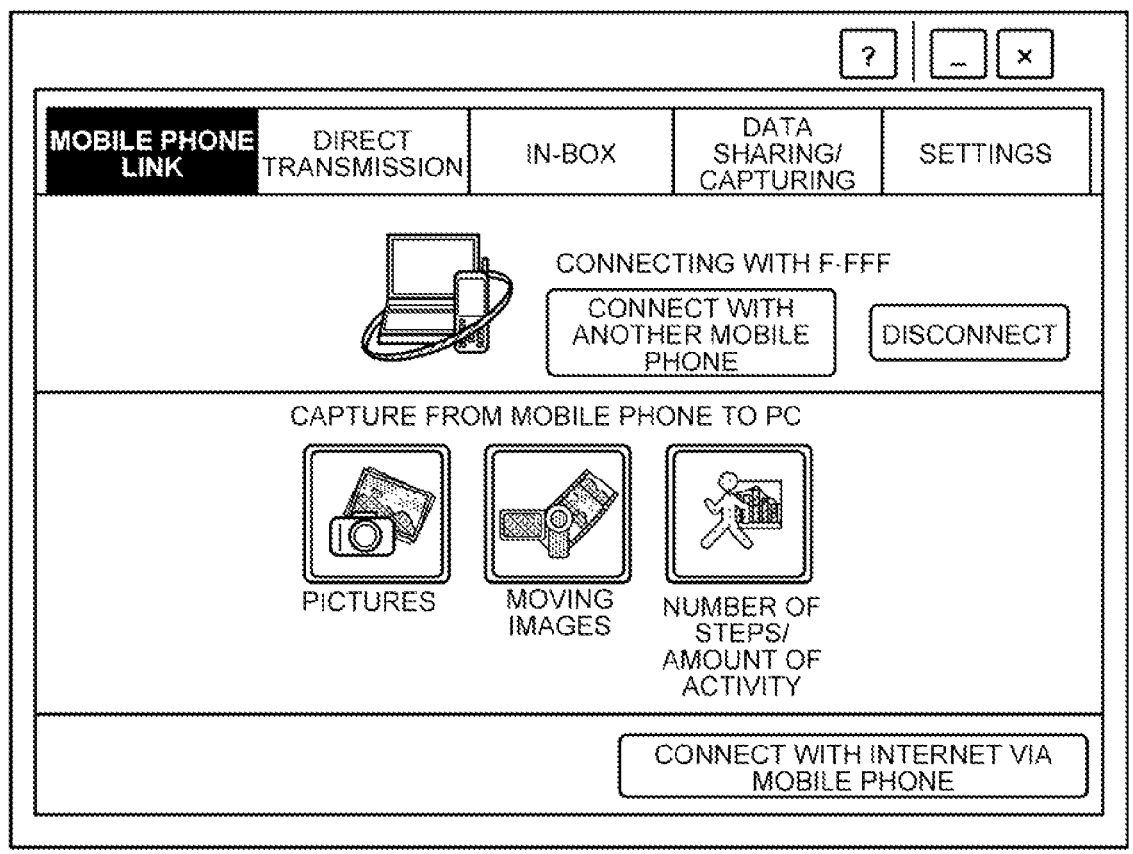
FIG. 11C is an exemplary illustration of a screen displayed on a PC in a link connection state.

FIG. 11C is an exemplary illustration of a screen displayed on a PC in a link connection state. As depicted in FIG. 11C, when the PC 2 and the mobile phone 3 turn to the link connection state, the PC 2 displays data that is capturable from the mobile phone 3 based on the setting information of the setting information file. In FIG. 11C, the PC 2 is capturable from the mobile phone 3 data of pictures, moving images, and the number of steps/the amount of activity.

Example of Data Structure of Setting Information File

FIG. 12 is an exemplary illustration of a data structure of the setting information file. As depicted in FIG. 12, the setting information file stores that each link function is valid or invalid. Here, the link functions are a picture data capture function, a moving image data capture function, and a capture function of data on the number of steps and the amount of activity. For example, in the case where the value of the picture is "0", the picture data capture function is set to invalid in the mobile phone 3, and picture data are not permitted to be captured in the PC 2; accordingly, a button corresponding to "PICTURES" on the screen depicted in FIG. 11C is not displayed. Moreover, in this case, in the case where the values of the moving image and the number of steps/the amount of activity are "1" respectively, the functions to capture these data are set to valid; accordingly, buttons corresponding to "MOVING IMAGES" and "NUMBER OF STEPS/AMOUNT OF ACTIVITY" are displayed on the screen depicted in FIG. 11C. These buttons are examples of display objects operated by the user.

In this manner, the device link unit 222 of the PC 2 requests the setting information file from the mobile phone 3, and the device link unit 322 of the mobile phone 3 transmits the setting information file to the PC 2. The device link unit 222 of the PC 2 then receives the setting file to display functions of linking with the mobile phone 3, in other words, data that is capturable from the mobile phone 3, based on the information on the received setting information file. For example, it is sufficient as long as the device link unit 222 of the PC 2 does not display on the mobile phone link screen the buttons corresponding to the link functions set to invalid on the mobile phone 3 side and displays only the buttons corresponding to the validated link functions. Moreover, for example, it is also sufficient as long as the device link unit 222 of the PC 2 displays the buttons corresponding to the link functions on the mobile phone link screen, does not execute the data capture process when the buttons corresponding to the link functions set to invalid on the mobile phone 3 side are selected, and executes the data capture process only when the buttons corresponding to the link functions set to valid are selected. In this manner, the device link unit 222 allows for prevention of the data link functions set to invalid on the data transmission side from being executed by controlling in a manner of inhibiting the execution of such link functions. Therefore, the execution of a useless process is prevented, which allows for prevention of the PC 2 from capturing data that the user on the data transmission side does not want to transmit to the data request side.

Here, the link units 22 and 32 transmit and receive the setting information by wireless communication; however, the link units 22 and 32 are able to transmit and receive the setting information also by wired communication.

Moreover, in the above embodiment, shown was the case where the PC 2 starts the search process of the mobile phone 3 in Step S301 while the link unit 3 of the mobile phone 3 is in an unactivated state. Therefore, it is determined in Step S304 that there is no response from the mobile phone 3 selected in the mobile phone link screen of the PC 2. However, as described above, when the link unit (the device link unit 222) is activated at the receipt of a remote instruction (transmission message) for resumption or activation from the mobile phone 3 selected on the mobile phone link screen of the PC 2, the device link unit 222 is to receive a response from the mobile phone 3 that gave the remote instruction in the search process upon activation. In this manner, when an instruction from the mobile phone 3 becomes a trigger for the start of the search process by the device link unit 222, the PC 2 is to start the processing not in Step S301 but in Step S310 in FIG. 10. Therefore, the device link unit 222 of the PC 2 turns to a state linkable with the mobile phone 3 (a state capable of capturing data from the mobile phone 3) immediately after activation.

Link with Multiple PCs

Figure 13:
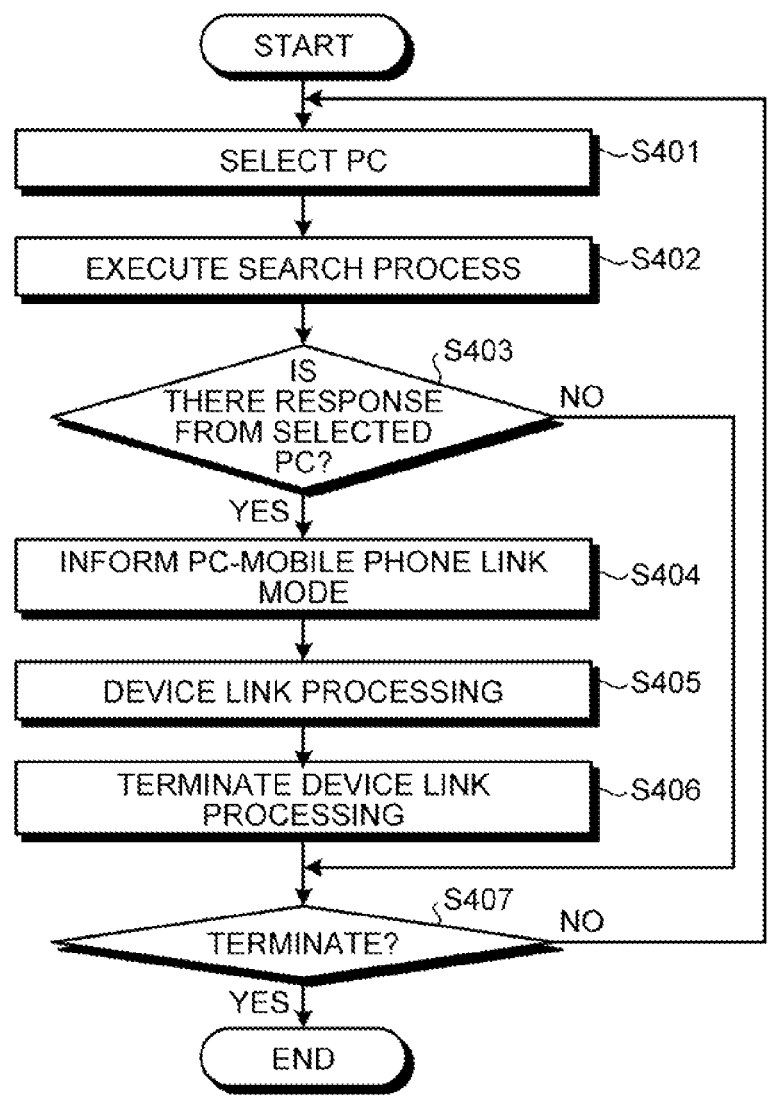
FIG. 13 is a flowchart of a processing procedure for transmitting data to a plurality of PCs.

Next, a description will be given of a processing procedure of the link unit 32 for the case of transmitting data such as pictures, moving images, and the number of steps/the amount of activity from one mobile phone 3 to n number (n being two or more) of PCs 2. FIG. 13 is a flowchart illustrating a processing procedure of the link unit 32 for the case of transmitting data such as pictures, moving images, and the number of steps/the amount of activity from one mobile phone 3 to n number of PCs 2. However, it is assumed here that the one mobile phone 3 and the n number of PCs 2 have mutually authenticated and registered each other. In other words, the execution of the setup sequence depicted in FIG. 8 (Step S126 in FIG. 6B) causes the mobile phone 3 to store the device information of the n number of PCs 2 on the link data storage 325, and causes the PCs 2 to store the device information of the mobile phone 3 on the link data storage 225. Moreover, a device selection unit of the mobile phone 3 is set in the following to be a device selection unit 327 corresponding to the device selection unit 227 of the PC 2.

As depicted in FIG. 13, the device selection unit 327 of the mobile phone 3 selects a first PC 2 as a transmission partner based on the user's instruction (Step S401). The user can select a PC 2 to be a transmission partner from the PC link screen displayed in Step S305 in FIG. 10. The device selection unit 327 of the mobile phone 3 informs the PC 2 selected by the user as a link target device to the device link unit 322 of the mobile phone 3, and requests the device link unit 322 of the mobile phone 3 to link with the PC 2. At the request to link with the PC 2, the device link unit 322 of the mobile phone 3 executes a search process by a similar process to Step S306 in FIG. 10 (Step S402). The device link unit 322 of the mobile phone 3 then determines the presence or absence of a response from the selected PC 2 by a similar process to Step S308 in FIG. 10 based on the search result within a predetermined time from the search start, and determines the connectivity with the PC 2 (Step S403). When a response from the selected PC 2 is included in the search result (Step S403; Yes), the device link unit 322 of the mobile phone 3 determines to be connectable with the selected PC 2 to transmit a PC-mobile phone link mode notification to the selected PC 2 by a similar process to Step S309 in FIG. 10 (Step S404). On the other hand, when a response from the selected PC 2 is not included in the search result (Step S403; No), the device link unit 322 of the mobile phone 3 does not transmit a PC-mobile phone link mode, and the processing shifts to Step S407.

After the transmission of the PC-mobile phone link mode notification, similar processing to Steps S310 to S317 in FIG. 10 is executed to establish a connection between the selected PC 2 and the mobile phone 3. After the establishment of a connection, the device link processing is executed between the selected PC 2 and the mobile phone 3 in accordance with the operation by the user (Step S405). The device link processing is the capture of various data from the mobile phone 3 described with, for example, FIGS. 11C and 12.

When being instructed by the user to terminate the link with the selected PC 2, the device link unit 322 of the mobile phone 3 disconnects from the selected PC 2 to terminate the device link processing (Step S406). The device link unit 322 of the mobile phone 3 then returns to the display of the PC link screen after displaying a message to the effect that the connection with the PC 2 has been cut, for example. When the termination operation of the PC link screen is performed by the user afterward (Step S407; Yes), the processing procedure terminates. On the other hand, when the termination operation of the PC link screen is not performed (Step S407; No), and the operation for selecting another PC 2 is performed by the user, the processing shifts to Step S401. The above processing (Steps S401 to 407) is then executed targeting the PC 2 newly selected by the user.

In this manner, the link unit 32 of the mobile phone 3 operates to establish a connection only with one PC 2 selected by the user in a state linkable with a plurality of PCs 2, and the selected one PC 2 confirms that the device information of the mobile phone 3 has been registered in the device itself and operates to establish the connection. After the connection is established in this manner, the device link processing is executed between the mobile phone 3 and the one PC 2. Therefore, even if the mobile phone 3 is linkable, data transmission to PCs 2 for which the connection is not established (PCs to which data should not been transmitted) is prevented, and the capture of useless data from the mobile phone 3 is prevented in the PC 2. Accordingly, data privacy is secured without leaking data in the mobile phone 3 to irrelevant devices. Such an effect is not limited to a mobile phone and a PC as in the embodiment, but is similarly produced in a relationship between a device holding data and a plurality of other devices.

Moreover, the mobile phone 3 is used in a state where the power is always ON while the PC 2 are in a standby state such as a sleep state and a hibernate state or a shutdown state in many cases. In such a case, the link unit 32 of the mobile phone 3 issues a magic packet to the PC 2 to resume or start the PC 2, which allows for start of the PC-mobile phone link by activating the link unit 22.

Internet Connection

Next, a description will be given of Internet connection processing between the Internet connection unit 223 in the link unit 22 of the PC 2 and an Internet connection unit in the link unit 32 of the mobile phone 3. In the following, the Internet connection unit and a setup unit of the mobile phone 3 are set to be an Internet connection unit 323 and the setup unit 321 corresponding to the Internet connection unit 223 and the setup unit 221 of the PC 2, respectively.

Figure 14:
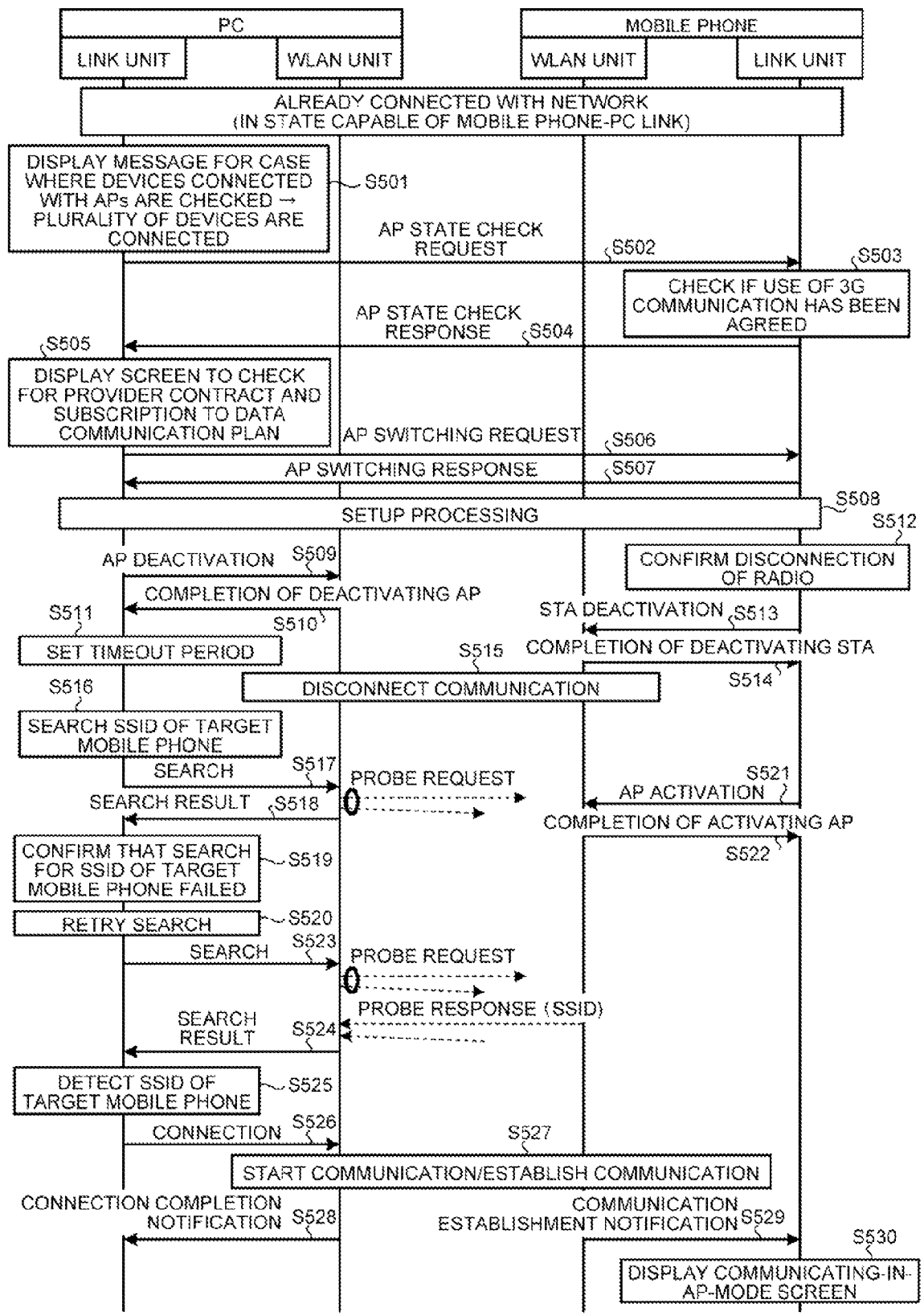
FIG. 14 illustrates a sequence of the Internet connection processing.

FIG. 14 illustrates a sequence of Internet connection processing between the Internet connection unit 223 of the PC 2 and the Internet connection unit 323 of the mobile phone 3. It is assumed in FIG. 14 that the PC 2 and the mobile phone 3 are in a linkable state, taking the PC 2 as the AP unit 211 (indicated as AP in FIG. 14) and that "CONNECT WITH INTERNET VIA MOBILE PHONE" has been selected on the mobile phone link screen depicted in FIG. 11C. Moreover, FIG. 14 depicts the Internet connection unit 223 and the Internet connection unit 323 as the link units.

As depicted in FIG. 14, the Internet connection unit 223 of the PC 2 checks information communication devices connecting with the AP unit 211, and displays a message to inform the disconnection on the PC screen in the case where there is an information communication device connecting with the AP unit 211 other than the mobile phone 3 (Step S501). The Internet connection unit 223 then displays a screen to select the continuation or cancellation of the Internet connection. If the user selects the cancellation, the Internet connection unit 223 terminates the processing, and the control is returned to the display of the mobile phone link screen depicted in FIG. 11C. On the other hand, if the user selects the continuation of the Internet connection, the Internet connection unit 223 transmits an AP state check request to the mobile phone 3 (Step S502).

The Internet connection unit 323 of the mobile phone 3 thereupon checks whether or not the user has agreed to use 3G communication on the mobile phone 3 via the AP unit 311 (indicated as AP in FIG. 14) (Step S503), and transmits to the PC 2 the checked state as an AP state check response (Step S504). The description was given of the case of using 3G communication here; however, it is possible to use other data communications such as WiMAX (Worldwide Interoperability for Microwave Access) and LTE (Long Time Evolution).

The Internet connection unit 223 of the PC 2 receives the AP state check response, and displays a message to inform that the AP unit 311 of the mobile phone 3 is not usable in the case where the use of 3G communication via the AP unit 311 has not been agreed in the mobile phone 3. The Internet connection unit 223 then terminates the processing, and the control is returned to the display of the mobile phone link screen depicted in FIG. 11C. On the other hand, in the case where the use of 3G communication via the AP unit 311 has been agreed in the mobile phone 3, the Internet connection unit 223 displays a screen to check for a provider contract and a subscription to a data communication plan (Step S505). The Internet connection unit 223 then displays the screen to select the continuation or cancellation of the Internet connection. If the user selects the cancellation, the Internet connection unit 223 terminates the processing, and the control is returned to the display of the mobile phone link screen depicted in FIG. 11C. Checking the user for his/her provider contract and subscription to a data communication plan prevents the user from being unintentionally charged on the mobile phone 3 for a packet fee.

On the other hand, when the user selects the continuation of the Internet connection, the Internet connection unit 223 transmits an AP switching request to the mobile phone 3 (Step S506). The Internet connection unit 323 of the mobile phone 3 receives the AP switching request, and transmits to the PC 2 an AP switching response as a response thereto (Step S507).

The Internet connection units 223 and 323 subsequently instruct the setup units 221 and 321, respectively, to perform the setup process (to execute the setup sequence depicted in FIG. 8) (Step S508). Here, the reason for executing the setup process is because the PC 2 and the mobile phone 3 mutually exchange the latest information. Moreover, in the setup sequence depicted in FIG. 8, the mobile phone 3 transmits a setup start request to the PC 2; however, the setup may also be performed by transmitting a setup start request from the PC 2 side that has received the AP switching response to the mobile phone 3. In this case, the transmission side and the reception side of the processes in the Steps illustrated in FIG. 8 are to be interchanged.

When the setup process is complete, the Internet connection unit 223 of the PC 2 then transmits AP deactivation to the WLAN unit 21 (Step S509). After receiving the instruction to deactivate the AP unit 211 and completing the deactivation of the AP unit 211, the WLAN unit 21 transmits AP deactivation completion to the Internet connection unit 223 (Step S510). At this point, the communication with another information communication device connected to the AP unit 211 other than the mobile phone 3 is cut. The Internet connection unit 223 of the PC 2 then receives a notification of the AP deactivation completion and sets a timeout period (Step S511). When the timeout period elapses before the AP unit 311 of the mobile phone 3 being a connection target is searched, the user is informed to check the state of the AP unit 311 on the mobile phone 3 side.

The Internet connection unit 223 is set here to transmit the AP deactivation to the WLAN unit 21 and to deactivate the operation of the AP; however, it may also so configured as to deactivate the operation of the AP. In other words, in the WLAN unit 21 of the PC, both of the AP unit 211 and the STA unit 212 may also simultaneously operate.

Moreover, when the setup process is complete, the Internet connection unit 323 of the mobile phone 3 confirms the disconnection of radio (Step S512). The Internet connection unit 323 then transmits STA deactivation to the WLAN unit 31 (Step S513). After receiving the instruction to deactivate the STA unit 312 and completing the deactivation of the STA unit 312, the WLAN unit 31 transmits the STA deactivation completion to the Internet connection unit 323 (Step S514). These processes disconnect wireless communication between the WLAN unit 21 of the PC 2 and the WLAN unit 31 of the mobile phone 3 (Step S515).

The Internet connection unit 223 of the PC 2 searches the SSID of the mobile phone 3 being a connection target afterward (Step S516). In other words, the Internet connection unit 223 of the PC 2 instructs the WLAN unit 21 to search the SSID of the mobile phone 3 being a connection target (Step S517), and the STA unit 212 of the WLAN unit 21 transmits a Probe request. If the AP unit 311 of the mobile phone 3 is operating, the AP unit 311 of the mobile phone 3 transmits a Probe response (including the SSID) in response to the reception of the Probe request. The STA unit 212 of the WLAN unit 21 receives the Probe response from the mobile phone 3, and the Internet connection unit 223 of the PC 2 receives the search result from the WLAN unit 21 (Step S518). FIG. 14 illustrates a case where the AP unit 311 of the mobile phone 3 being a mobile phone connection target is unactivated at this point; accordingly, the search result does not include the relevant SSID. Therefore, the Internet connection unit 223 confirms the failure to search the SSID of the mobile phone 3 being a connection target (Step S519), and retries a search (Step S520).

On the other hand, the Internet connection unit 323 of the mobile phone 3 transmits AP activation to the WLAN unit 31 (Step S521). After receiving the instruction to activate the AP unit 311 and completing the activation of the AP unit 311, the WLAN unit 31 transmits AP activation completion to the Internet connection unit 323 (Step S522).

The Internet connection unit 223 of the PC 2 instructs the WLAN unit 21 to conduct a search to retry a search (Step S523). The STA unit 212 of the WLAN unit 21 receives the search instruction and transmits a Probe request. FIG. 14 illustrates that the AP unit 311 of the mobile phone 3 is operating at this point, and the AP unit 311 of the mobile phone 3 transmits a Probe response in response to a Probe request. The STA unit 212 of the WLAN unit 21 receives the Probe response from the mobile phone 3, and the Internet connection unit 223 of the PC 2 receives the search result from the WLAN unit 21 (Step S524). The Internet connection unit 223 then detects the SSID of the mobile phone 3 being a connection target (Step S525), and instructs the WLAN unit 21 to connect to the AP unit 311 of the mobile phone 3 (Step S526).

Figure 15:
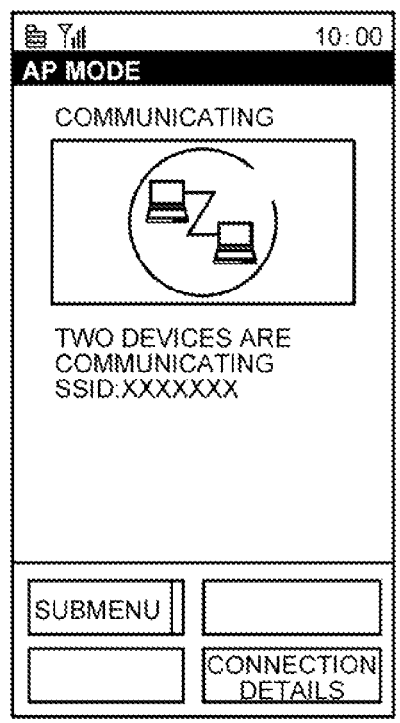
FIG. 15 is an exemplary illustration of a communicating-in-AP-mode screen.

The communication between the WLAN unit 21 of the PC 2 and the WLAN unit 31 of the mobile phone 3 is then started and is established (Step S527). The WLAN unit 21 then informs the Internet connection unit 223 of the connection completion (Step S528), and the WLAN unit 31 informs the Internet connection unit 323 of the communication establishment (Step S529). The Internet connection unit 323 of the mobile phone 3 then displays a communicating-in-AP-mode screen (Step S530). FIG. 15 is an exemplary illustration of the communicating-in-AP-mode screen. As depicted in FIG. 15, for example, the number of information communication devices in connection and the SSID of the device itself are displayed on the communicating-in-AP-mode screen.

In this manner, the Internet connection units 223 and 323 dissolve the PC-mobile phone link where the PC 2 operates as an AP and the mobile phone 3 operates as an STA, and cause the PC 2 and the mobile phone 3 to operate as an STA and an AP, respectively. The Internet connection units 223 and 323 then connect the PC 2 with the Internet via the mobile phone 3. Accordingly, the user can easily switch an AP and an STA between the PC 2 and the mobile phone 3. Therefore, the user can easily use the Internet with the PC 2 simply by setting the PC-mobile phone link in a case where the PC 2 is not connected to a network, such as outdoors.

Moreover, the Internet connection units 223 and 323 execute the AP switching only when the use of 3G communication on the mobile phone 3 via an AP is permitted, which allows for prevention of the use of 3G communication that the user does not intend. Moreover, the Internet connection unit 223 checks the user for his/her provider contract and subscription to a data communication plan, which allows for encouraging the user to give attention to charges due for, for example, data communication. Moreover, the Internet connection units 223 and 323 execute the setup process to exchange the latest information between the PC 2 and the mobile phone 3 for the use of the AP function of the mobile phone 3. Therefore, the user can use the AP function even in the case where the state of the AP of the mobile phone 3 has been changed by the user.

The description was given here of the case where the Internet connection units 223 and 323 switch the PC 2 from an AP to an STA and the mobile phone 3 from an STA to an AP; however, the Internet connection units 223 and 323 may also so configured as to switch the PC 2 from an STA to an AP and the mobile phone 3 from an AP to an STA in a similar procedure.

Processing Sequence in Quick Mode

Next, a description will be given of processing in quick mode between the quick connection unit 224 of the PC 2 and a quick connection unit 324 of the mobile phone 3. As described above, the quick mode is an operating mode used when two information communication devices that do not belong to a network temporarily connect to each other, where a file is transmitted and received directly after the connection between the information communication devices. Here, the transmission of a file in the quick mode is referred to as "direct transmission" and the reception of a file as "direct reception."

FIGS. 16A to 16E illustrate a processing sequence in the quick mode between the quick connection unit 224 of the PC 2 and the quick connection unit 324 of the mobile phone 3. In FIGS. 16A to 16E, a description will be given assuming that the PC 2 operates as an access point (AP) and the mobile phone 3 as a station (STA). Moreover, the quick connection unit of the mobile phone 3 is set to be the quick connection unit 324 of the mobile phone 3 corresponding to the quick connection unit 224. Moreover, the link data storage of the mobile phone 3 is set to be the link data storage 325 corresponding to the link data storage 225. Furthermore, it is assumed in FIGS. 16A to 16E that authentication and registration were not mutually performed in advance between the PC 2 and the mobile phone 3, an in-box for receiving a file in the PC 2 has been selected by the user, and a direct reception start screen depicted in FIG. 17A is being displayed on the screen of the PC 2. Moreover, with regard to the mobile phone 3 to link with, it is assumed that the user has turned on the mobile phone 3, and that a file selection screen depicted in FIG. 17D is being displayed on the screen of the mobile phone 3 through the PC link selection screen. Moreover, wireless communication between the PC 2 and the mobile phone 3 is performed via the WLAN units 21 and 31.

Figure 16A:
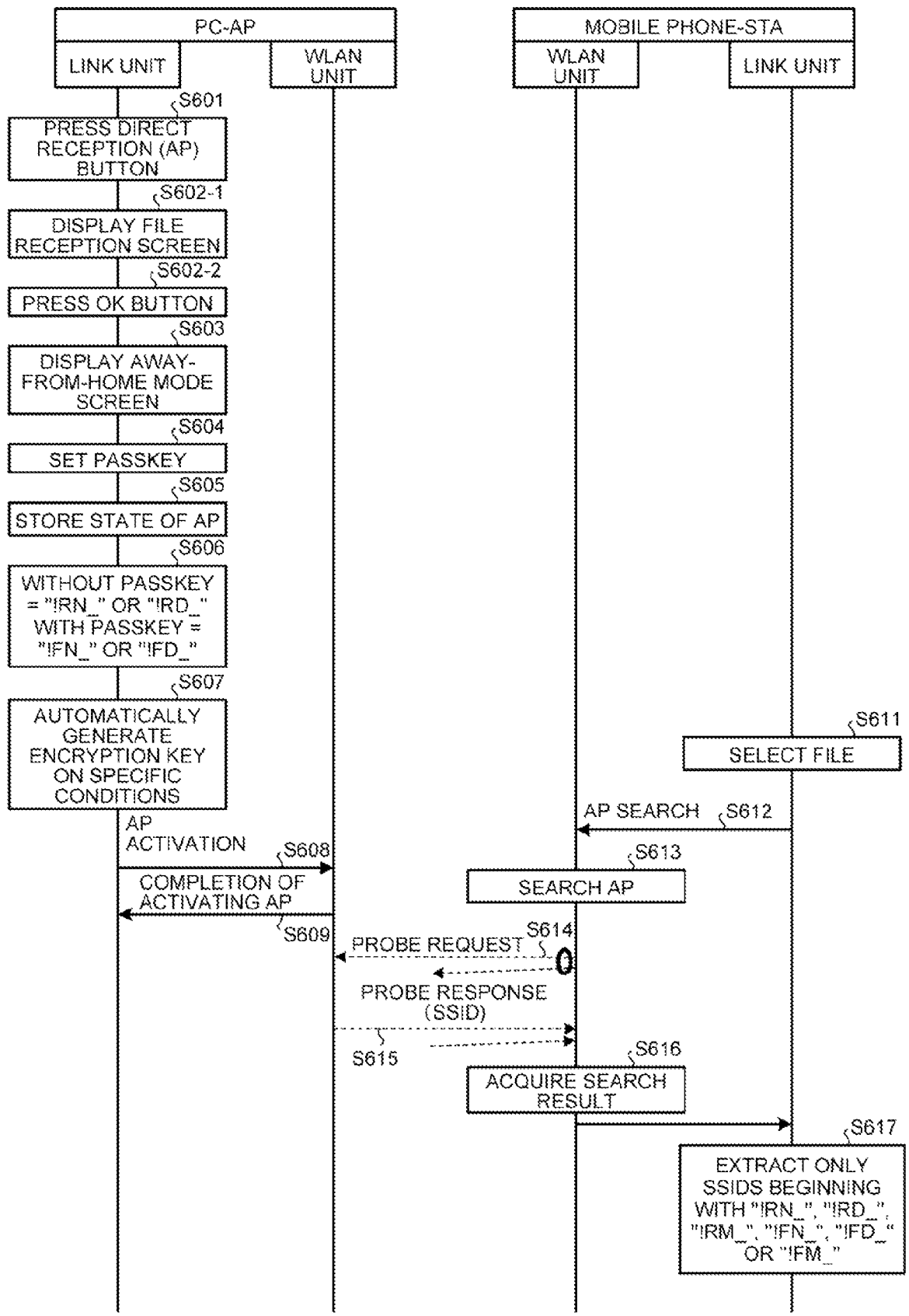
FIG. 16A illustrates a processing sequence in the quick mode according to the embodiment.
Figure 16B:
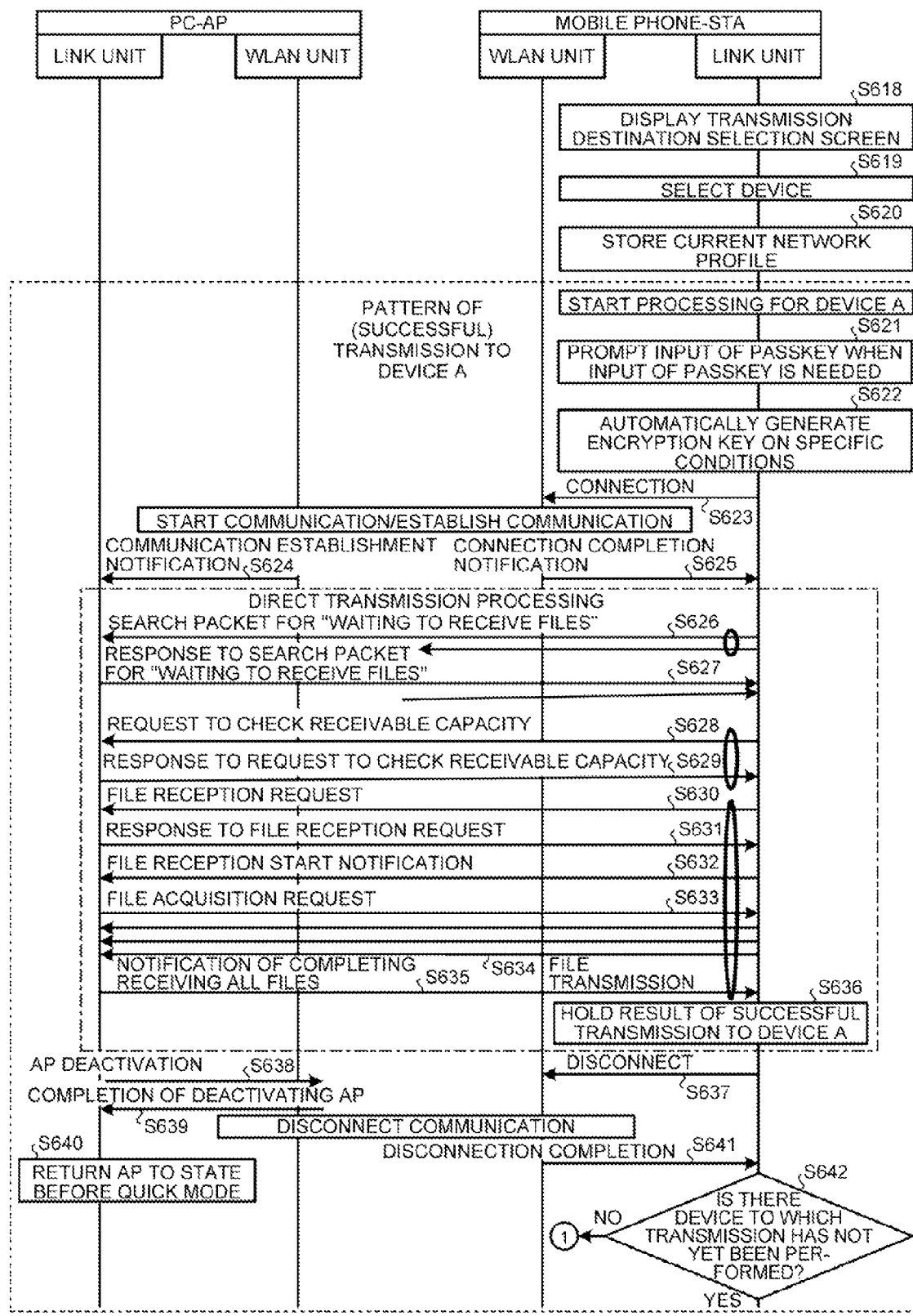
FIG. 16B illustrates the processing sequence in the quick mode according to the embodiment.
Figure 16C:
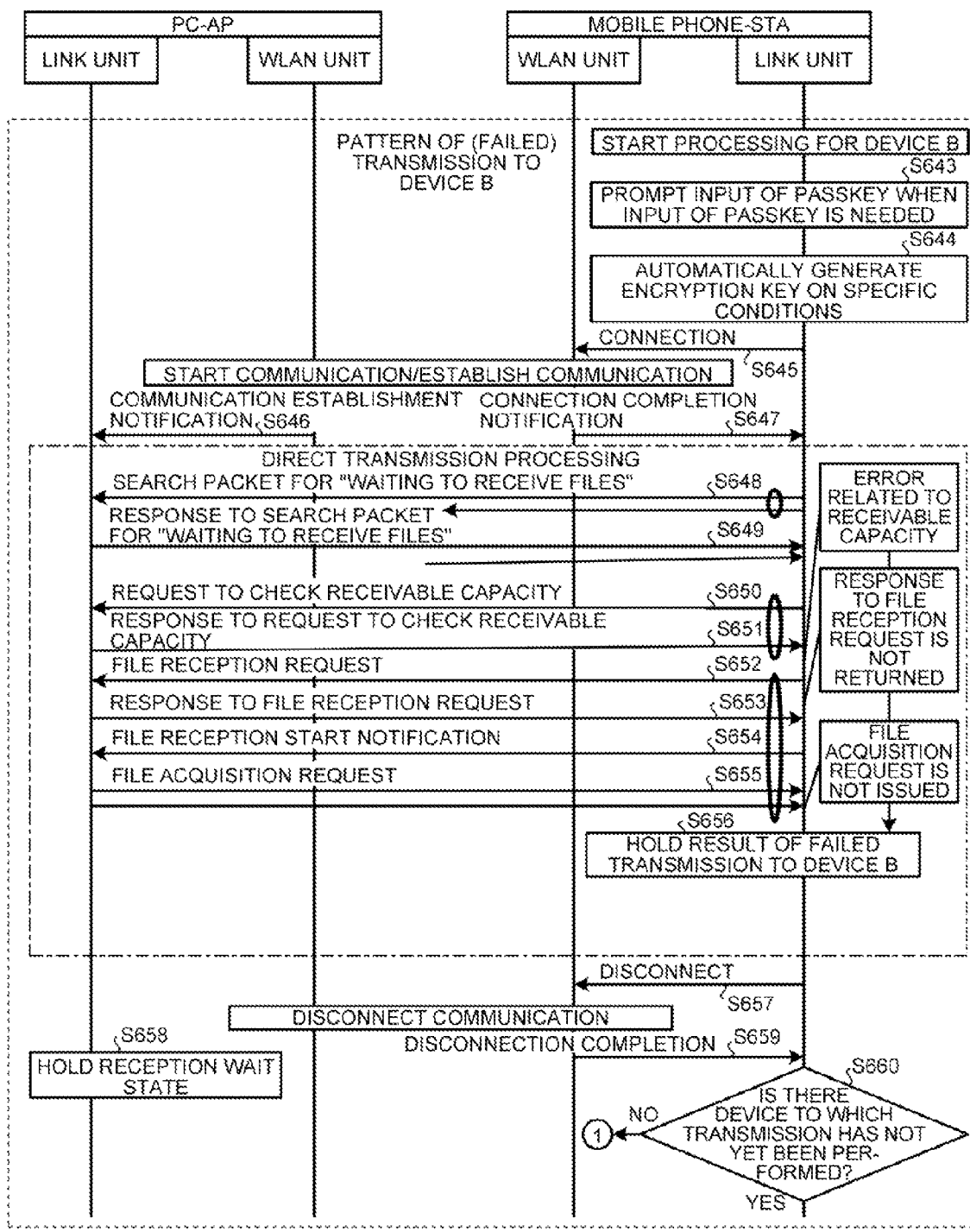
FIG. 16C illustrates the processing sequence in the quick mode according to the embodiment.
Figure 16D:
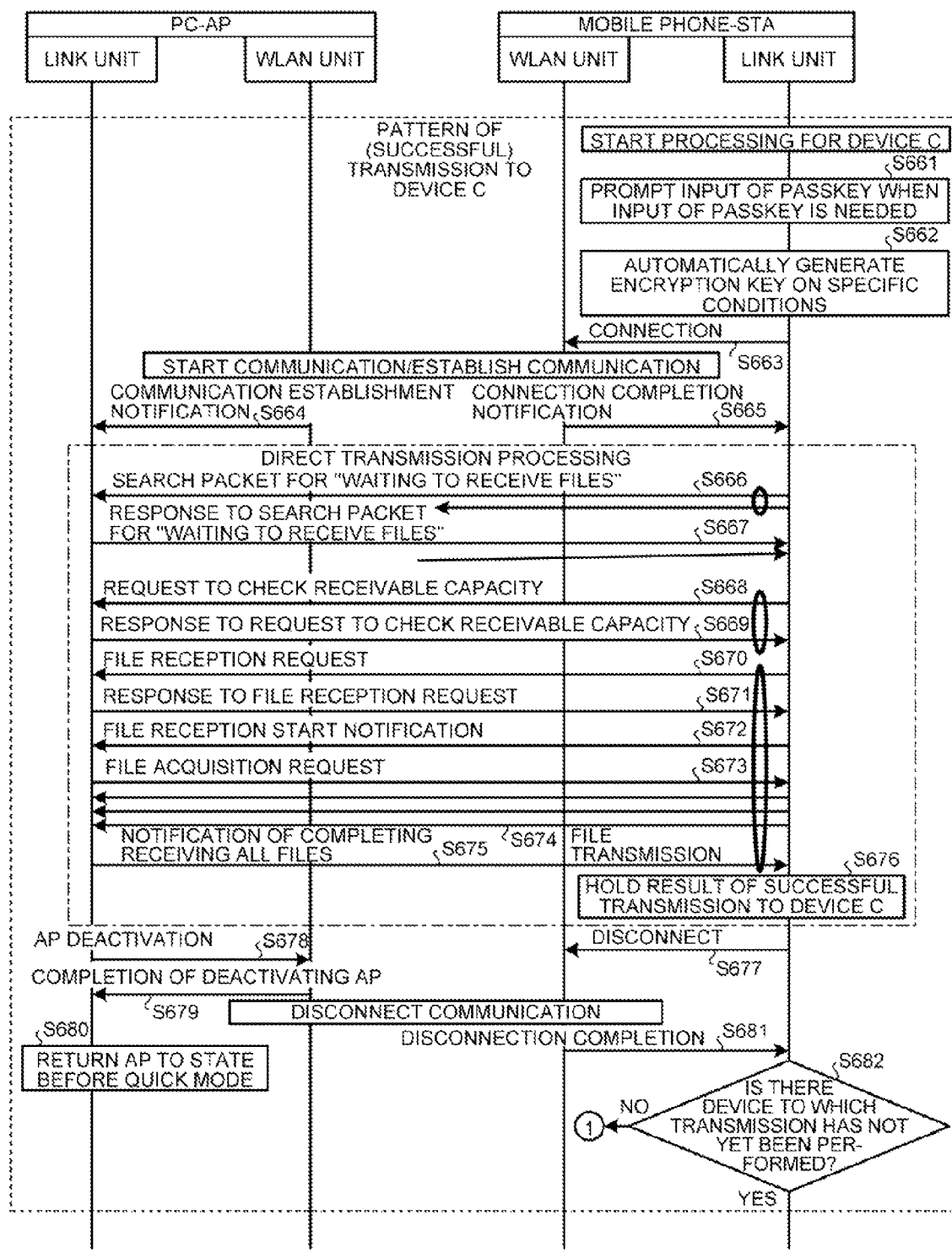
FIG. 16D illustrates the processing sequence in the quick mode according to the embodiment.
Figure 16E:
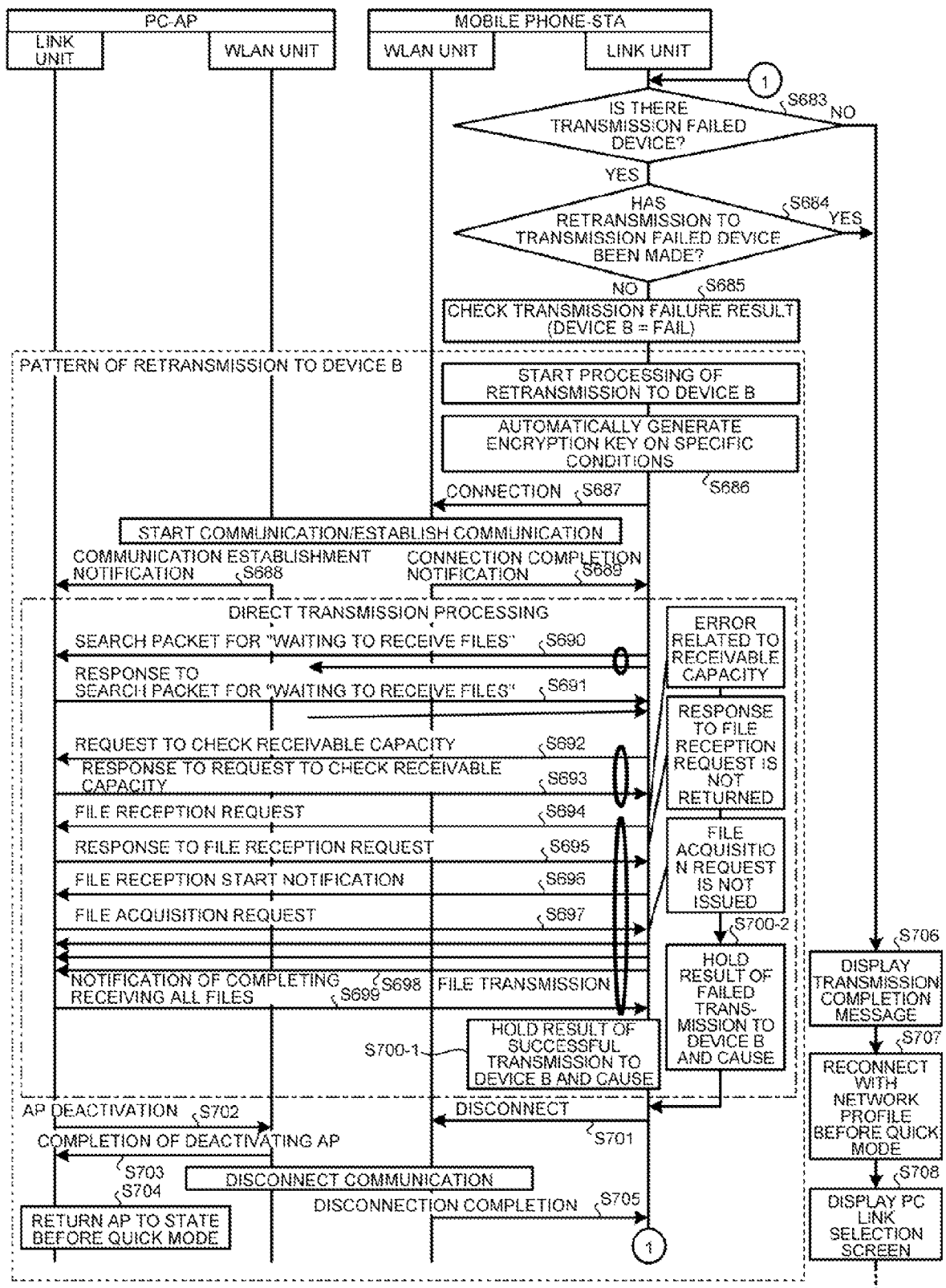
FIG. 16E illustrates the processing sequence in the quick mode according to the embodiment.
Figure 17A:
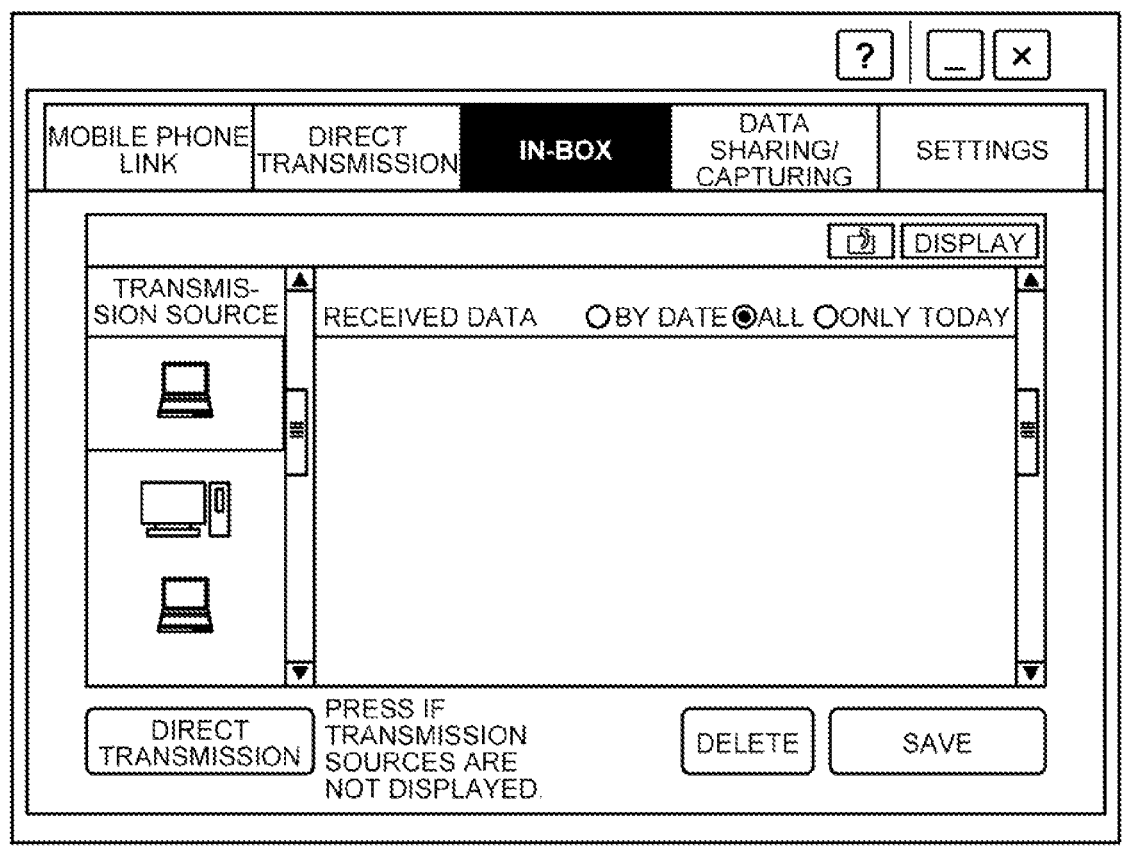
FIG. 17A is an exemplary illustration of a direct reception start screen.

As depicted in FIG. 16A, a direct reception button on the direct reception start screen is pressed by the user in the PC 2 (Step S601). The quick connection unit 224 of the PC 2 thereupon displays a file reception screen indicating a confirmation of the reception of an awaited file (Steps S602-1). At this time, if the AP unit 211 (indicated as AP in FIGS. 16A to 16E) is operating and is connecting with the STA unit of another device in the already constructed network, the quick connection unit 224 displays a message to the effect that the connection will be cut temporarily on the file reception screen. Therefore, the quick connection unit 224 is capable of clearly showing the user the disconnection from the already connected network.

When an OK button on the file reception screen is pressed by the user (Step S602-2), the quick connection unit 224 of the PC 2 then displays a screen prompting the user to set a passkey in a case of connecting away from home (hereinafter referred to as an away-from-home mode screen) (Step S603). The network security deteriorates in public places such as away from home compared with in home. Therefore, specification by the user of a passkey on this screen allows for strengthening of security in a case of a device-to-device connection in, for example, public places. If security is not particularly strengthen, the user does not need to specify a passkey on this screen. Here, when the user specifies a passkey, the quick connection unit 224 sets the passkey based on it (Step S604).

The quick connection unit 224 of the PC 2 then stores in the link data storage 225 an AP state indicating whether or not the AP unit 211 is operating (Step S605). The quick connection unit 224 then generates a new SSID by adding to the head of the SSID for normal operation "!RN_" or "!RD_", which indicates without a passkey, or "!FN_" or "!FD_", which indicates with a passkey (Step S606). The newly generated SSID becomes a quick-mode SSID. In other words, the quick connection unit 224 adds "!RN_" in the case where it is without a passkey and the PC 2 is a PC-NB, and "!RD_" in the case where it is without a passkey and the PC 2 is a PC-DT. Moreover, the quick connection unit 224 adds "!FN_" in the case where it is with a passkey and the PC 2 is a PC-NB, and "!FD_" in the case where it is without a passkey and the PC 2 is a PC-DT. In the case where the device itself is a mobile phone, the quick connection unit 224 adds "!RM_" in the case where it is with a passkey, and "!FM_" in the case where it is without a passkey.

Next, the quick connection unit 224 of the PC 2 automatically generates an encryption key with the quick-mode SSID on specific conditions (Step S607). The quick connection unit 224 then requests the WLAN unit 21 to activate the AP unit 211 (Step S608). The WLAN unit 21, which has been requested to activate the AP unit 211, activates the AP unit 211 and informs the quick connection unit 224 to have completed activating the AP (Step S609).

On the other hand, the quick connection unit 324 of the mobile phone 3 selects a file to be transmitted to a PC based on the user's instruction (Step S611).

Furthermore, the quick connection unit 324 of the mobile phone 3 searches a PC to operate as an AP via the WLAN unit 31 for a search for an AP that does not belong to the same network and belongs to another network (Steps S612 and 613). In other words, the STA unit 312 of the WLAN unit 31 transmits a Probe request (Step S614). In response to the Probe request, the AP unit 211 of the PC 2, which has completed the activation as described above, informs the Probe response to the WLAN unit 31 of the mobile phone 3 (Step S615). The Probe response from the PC 2 includes a quick-mode SSID where an identifier is added to the SSID for normal operation of the PC 2. The STA unit 312 of the WLAN unit 31 then informs the quick connection unit 324 of the Probe response from the PC 2 and the Probe responses acquired within a predetermined time as a search result (Step S616).

The quick connection unit 324, which has acquired the search result from the STA unit 312 of the WLAN unit 31, then extracts the quick-mode SSIDs from the search result (Step S617). In other words, the quick connection unit 324 extracts SSIDs beginning with "!RN_", "!RD_", "!RM_", "!FN_", "!FD_" or "!FM_."

The quick connection unit 324 of the mobile phone 3 then displays a transmission destination selection screen indicating a list of devices that can be specified as transmission destinations based on the result of the SSID extraction (Step S618). The quick connection unit 324 then selects devices selected from the device list as transmission destination devices in accordance with the user's selection instruction given by an input device (Step S619). It is assumed here that the user has selected three devices of devices A, B, and C as transmission destination devices from the device list. The quick connection unit 324 is to select the devices A, B, and C in turn as transmission destinations based on the result of the selection by the user and execute file transmission processing. The quick connection unit 324 of the mobile phone 3 stores in the link data storage 325 information on the devices selected on the transmission destination selection screen.

The quick connection unit 324 of the mobile phone 3 stores profile information of the current network on the link data storage 325 before starting the file transmission processing (Step S620). This is because the connection is returned to the current network after the processing in the quick mode terminates.

Transmission to Device A

The quick connection unit 324 of the mobile phone 3 selects the device A from the transmission destination devices selected by the user to start the processing targeted for the device A. The quick connection unit 324 prompts the user to input a passkey in the case where input of the passkey is needed (Step S621). In the embodiment, in the case where an SSID begins with "!FN_", "!FD_", or "!FM_", it indicates that an input of a passkey is needed to communicate with a device indicated with the SSID. In other words, in the case where the SSID of the selected device begins with "!FN_", "!FD_", or "!FM_", the quick connection unit 324 prompts the user to input a passkey.

Next, the quick connection unit 324 of the mobile phone 3 automatically generates an encryption key with the SSID of the device A on specific conditions (Step S622). The specific conditions are the same algorithm as specific conditions used when an encryption key was automatically generated in the device A.

The quick connection unit 324 of the mobile phone 3 then informs the PC 2 via the WLAN unit 31 of a connection request to which the generated encryption key is added (Step S623). When the passkey is inputted, the quick connection unit 324 includes the passkey in the connection request. The WLAN unit 31 of the mobile phone 3 and the WLAN unit 21 of the PC 2 thereupon start communication, and perform authentication with the encryption key. At this point, in the case where the passkey is included in the connection request, the authentication with the passkey is also performed. When the authentication with the encryption key and the authentication with the passkey as needed are performed, the communication between the WLAN unit 31 of the mobile phone 3 and the WLAN unit 21 of the PC 2 is established. The WLAN unit 21 of the device A then informs the quick connection unit 221 of the establishment of the communication (Step S624). Moreover, the WLAN unit 31 of the mobile phone 3 informs the quick connection unit 321 of the completion of the connection (Step S625). Accordingly, the authentication between the PC 2 and the mobile phone 3 has been made.

Processing of Direct Transmission to Device A

If the authentication is made between the device A and the mobile phone 3, the quick connection unit 324 of the mobile phone 3 transmits a search packet for "waiting to receive files" to the device A (Step S626). When being able to receive files, the quick connection unit 224 of the device A transmits a response to the search packet for "waiting to receive files" to the mobile phone 3 (Step S627).

The quick connection unit 324 of the mobile phone 3 receives the response to the search packet for "waiting to receive files" from the device A, and transmits to the device A a request to check the receivable capacity (Step S628). The quick connection unit 224 of the device A receives the request to check the receivable capacity, checks the receivable capacity (usable capacity) of a storage of the device itself, and transmits a response to the request to check the receivable capacity to the mobile phone 3 (Step S629). The quick connection unit 224 of the device A includes the information on the checked receivable capacity in the response.

The quick connection unit 324 of the mobile phone 3 receives the response to the request to check the receivable capacity from the device A, compares the information on the receivable capacity included in the response with the capacity of the files to be transmitted, and transmits a request to receive the files to the device A when it is determined that the device A is able to receive the files to be transmitted (Step S630). The quick connection unit 224 of the device A receives the request to receive the files, and transmits a response to the file reception request to the mobile phone 3 (Step S631).

Next, the quick connection unit 324 of the mobile phone 3 receives the response to the file reception request, and transmits to the device A a file reception start notification regarding the files to be transmitted (Step S632). When the quick connection unit 224 of the device A transmits a file acquisition request to the mobile phone 3 in response to the reception of the file reception start notification (Step S633), the quick connection unit 324 of the mobile phone 3 transmits the files to the device A (Step S634).

Subsequently, when receiving all the files, the quick connection unit 224 of the device A transmits a reception completion notification to the mobile phone 3 (Step S635). The quick connection unit 324 of the mobile phone 3 holds the transmission result to the device A on the link data storage 325. Here, the quick connection unit 324 holds the fact that the transmission to the device A was successful as the transmission result on the link data storage 325 (Step S636). The processing from Steps S626 to S636 is referred to as the "direct transmission processing." In other words, the direct transmission processing is processing of transmitting files after temporarily connecting between devices without previously registering and setting information of a device being a party at the other end of a communication channel.

When the direct transmission processing with the device A terminates, the quick connection unit 324 of the mobile phone 3 disconnects the communication with the device A via the WLAN unit 31 (Step S637). On the other hand, the quick connection unit 224 of the device A instructs the WLAN unit 21 to deactivate the AP unit 211 (Step S638). The WLAN unit 21 informs the completion of deactivation to the quick connection unit 224 after deactivating the AP unit 211 (Step S639).

The quick connection unit 224 of the device A then receives the notification of deactivating the AP unit 211 to return the AP unit 211 to a state before the quick mode (Step S640). In other words, the quick connection unit 224 reads the state of the AP unit 211 stored on the link data storage 225 in Step S605, and instructs the AP unit 21 to return to the above-mentioned state. For example, if the state of the AP unit 211 stored on the link data storage 225 is a normal operating state, the quick connection unit 224 returns the SSID from the quick-mode SSID to the SSID for normal operation and returns to the encryption key for normal operation. As a result, the device A is to reconstruct a network with another device that constructed a network before the change to the quick mode.

On the other hand, when the communication between the device A and the mobile phone 3 is disconnected, the quick connection unit 324 of the mobile phone 3 receives a disconnection completion notification from the WLAN unit 31 (Step S641). Next, the quick connection unit 324 of the mobile phone 3 determines whether or not there exists a device to which transmission has not yet been performed (Step S642). The quick connection unit 324 of the mobile phone 3 determines the presence or absence of a device to which transmission has not yet been performed by use of information indicating devices selected as the transmission destination devices and information indicating the transmission results of the direct transmission processing corresponding to the devices, which are stored on the link data storage 325. When it is determined that there does not exist a device to which transmission has not yet been performed (Step S642; No), the quick connection unit 324 shifts the processing to Step S683 to reexecute the direct transmission processing on the transmission failed device.

On the other hand, when it is determined that there exists a device to which transmission has not yet been performed (Step S642; Yes), the quick connection unit 324 executes the direct transmission processing on the device to which transmission has not yet been performed. Here, the device B is a device to which transmission has not yet been performed; accordingly, the quick connection unit 324 of the mobile phone 3 selects the device B from the selection target devices to continuously start the processing targeted for the device B.

Transmission to Device B

Next, a description will be given of a case where direct transmission from the mobile phone 3 to the device B fails in the processing targeted for the device B. The processing from Steps S643 to S647 is the same as the one targeted for the device A from Steps S621 to S625; accordingly, redundant description of the operation will not be given.

Processing of Direct Transmission to Device B

When authentication is made between the device B and the mobile phone 3, the quick connection unit 324 of the mobile phone 3 transmits a search packet for "waiting to receive files" to the device B (Step S648). When being able to receive files, the quick connection unit 224 of the device B transmits a response to the search packet for "waiting to receive files" to the mobile phone 3 (Step S649).

The quick connection unit 324 of the mobile phone 3 receives the response to the search packet for "waiting to receive files" from the device B and transmits a request to check the receivable capacity to the device B (Step S650). The quick connection unit 224 of the device B receives the request to check the receivable capacity, checks the receivable capacity (usable capacity) of a storage of the device itself, and transmits a response to the request to check the receivable capacity to the mobile phone 3 (Step S651). The quick connection unit 224 of the device B includes the information on the checked receivable capacity in the response. The quick connection unit 324 of the mobile phone 3 receives the response to the request to check the receivable capacity from the device B, compares the information on the receivable capacity included in the response with the capacity of files to be transmitted, and shifts the processing to Step S656 as an error related to the receivable capacity when it is determined that the device B is unable to receive the files to be transmitted.

On the other hand, the quick connection unit 324 of the mobile phone 3 receives the response to the request to check the receivable capacity from the device B, and transmits a request to receive the files to the device B when it is determined by the above comparison that the device B is able to receive the files to be transmitted (Step S652). Here, in the case where the quick connection unit 224 of the device B does not respond to the file reception request, the quick connection unit 324 of the mobile phone 3 determines that the files are not transmitted to the device B on the grounds that it did not receive a response to the file reception request within a predetermined time, and shifts the processing to Step S656.

On the other hand, when the quick connection unit 224 of the device B responds to the file reception request (Step S653), the quick connection unit 324 of the mobile phone 3 receives the response to the file reception request, and transmits to the device B a file reception start notification regarding the files to be transmitted (Step S654). Here, in the case where the quick connection unit 224 of the device B does not issue a file acquisition request, the quick connection unit 324 of the mobile phone 3 determines that the files are unable to be transmitted to the device B on the grounds that it did not receive the file acquisition request in response to the file reception start notification within a predetermined time, and shifts the processing to Step S656. In the case of any state of an error related to the receivable capacity, an unreceived response to the file reception request, and an unreceived file acquisition request, the quick connection unit 324 of the mobile phone 3 holds on the link data storage 225 the transmission result to the effect that the file transmission to the device B failed (Step S656).

When the processing of direct transmission to the device B fails, the quick connection unit 324 of the mobile phone 3 disconnects the communication with the device B via the WLAN unit 31 (Step S657). On the other hand, the quick connection unit 224 of the device B failed to receive the files for any of the above reasons and accordingly holds the state of waiting to receive files in order to be standby for retransmission processing by the mobile phone 3 (Step S658).

When the communication between the device B and the mobile phone 3 is disconnected, the quick connection unit 324 of the mobile phone 3 receives a disconnection completion notification from the WLAN unit 31 (Step S659). Next, the quick connection unit 324 of the mobile phone 3 determines whether or not there exists a device to which transmission has not yet been performed (Step S660). The quick connection unit 324 of the mobile phone 3 is able to determine the presence or absence of a device to which transmission has not yet been performed based on the above-mentioned information held on the link data storage 325. When it is determined that there does not exist a device to which transmission has not yet been performed (Step S660; No), the quick connection unit 324 shifts the processing to Step S683 to reexecute the direct transmission processing on the transmission failed device.

On the other hand, in the case where it is determined that there exists a device to which transmission has not yet been performed (Step S660; Yes), the quick connection unit 324 executes the direct transmission processing on the device to which transmission has not yet been performed. As described above, the quick connection unit 324 is able to identify a device to which transmission has not yet been performed based on the information stored on the link data storage 325. Here, the device C is the device to which transmission has not yet been performed; accordingly, the quick connection unit 324 of the mobile phone 3 selects the device C from the selection target devices to continuously start the processing targeted for the device C.

Transmission to Device C

The processing from Steps S661 to S681 is the same as the one targeted for the device A from Steps S621 to S641; accordingly, redundant description of the operation will not be given. It is assumed here that the direct transmission from the mobile phone 3 to the device C was successful.

When the processing of the direct transmission between the device C and the mobile phone 3 is successful and the communication is disconnected, the quick connection unit 324 of the mobile phone 3 determines whether or not there exists a device to which transmission has not yet been performed (Step S682). The quick connection unit 324 of the mobile phone 3 is able to determine the presence or absence of a device to which transmission has not yet been performed based on the above-mentioned information held on the link data storage 325. When it is determined that there exists a device to which transmission has not yet been performed (Step S682; Yes), the quick connection unit 324 shifts to the direct transmission processing targeted for the device to which transmission has not yet been performed. On the other hand, when it is determined that there does not exist a device to which transmission has not yet been performed (Step S682; No), the quick connection unit 324 shifts the processing to Step S683 to reexecute the direct transmission processing on a transmission failed device.

Next, the quick connection unit 324 of the mobile phone 3 determines whether or not there exists a transmission failed device (Step S683). The quick connection unit 324 of the mobile phone 3 is able to determine the presence or absence of a transmission failed device based on the above-mentioned information held on the link data storage 325. When it is determined that there exists a transmission failed device (Step S683; Yes), the quick connection unit 324 determines whether to have performed retransmission to the transmission failed device (Step S684). The details will be described later; however, the retransmission result is held on the link data storage 325, and the quick connection unit 324 is able to determine whether to have performed retransmission with reference to the retransmission result. When it is determined that the retransmission to the transmission failed device was not performed (Step S684; No), the quick connection unit 324 confirms the transmission failure result held on the link data storage 325 (Step S685). Here, the quick connection unit 324 confirms that the device B failed.

Retransmission to Device B

The quick connection unit 324 of the mobile phone 3 executes retransmission to the device B as a result of ending in a failure in file transmission to the device B and confirming that retransmission to the device B has not been executed. The processing from Steps S686 to S699 is the same as the one targeted for the device A from Steps S622 to S635; accordingly, redundant description of the operation will not be given.

When the direct transmission processing is executed between the mobile phone 3 and the device B and the quick connection unit 324 of the mobile phone 3 receives a reception completion notification from the device B, the quick connection unit 324 holds the fact that the transmission to the device B was successful as the transmission result on the link data storage 325 (Step S700-1). On the other hand, when receiving an error related to the receivable capacity from the mobile phone 3, the quick connection unit 324 of the mobile phone 3 holds on the link data storage 325 the fact that the transmission to the device B failed again and the cause of the failure as the transmission result. Moreover, when there is no response to the file reception request, the quick connection unit 324 of the mobile phone 3 holds on the link data storage 325 the fact that the transmission to the device B failed again and the cause of the failure as the transmission result. Furthermore, when there is no issuance of the file acquisition request, the quick connection unit 324 of the mobile phone 3 holds on the link data storage 325 the fact that the transmission to the device B failed again and the cause of the failure as the transmission result (Step S700-2).

When the direct retransmission processing with the device B terminates, the quick connection unit 324 of the mobile phone 3 disconnects the communication with the device B via the WLAN unit 31 (Step S701). On the other hand, the quick connection unit 224 of the device B instructs the WLAN unit 21 to deactivate the AP unit 211 (Step S702). The WLAN unit 21 informs the completion of deactivation to the quick connection unit 224 after deactivating the AP unit 211 (Step S703).

The quick connection unit 224 of the device B then receives the notification of completing deactivating the AP unit 211 to return the AP unit 211 to a state before the quick mode (Step S704). In other words, the quick connection unit 224 reads the state of the AP unit 211 stored on the link data storage 225 in Step S605, and instructs the AP unit 21 to return to the above-mentioned state. For example, if the state of the AP unit 211 stored on the link data storage 225 is a normal operating state, the quick connection unit 224 returns the SSID from the quick-mode SSID to the SSID for normal operation and returns to the encryption key for normal operation. As a result, the device B is to reconstruct a network with another device that constructed a network before the change to the quick mode.

On the other hand, when the communication between the device B and the mobile phone 3 is disconnected, the quick connection unit 324 of the mobile phone 3 receives a disconnection completion notification from the WLAN unit 31 (Step S705). If there is another transmission failed device, the quick connection unit 324 of the mobile phone 3 then shifts the processing to Step S683 to execute retransmission processing targeted for the transmission failed device.

Returning to Step S683, when it is determined that there does not exist a transmission failed device (Step S683; No), the quick connection unit 324 of the mobile phone 3 shifts the processing to Step S706 to terminate the processing in the quick mode. Moreover, when it is determined that there exist transmission failed devices and that retransmission to all the transmission failed devices has been performed (Step S684; Yes), the quick connection unit 324 of the mobile phone 3 shifts the processing to Step S706 to terminate the processing in the quick mode.

The quick connection unit 324 of the mobile phone 3 then displays a transmission completion message on the screen of the mobile phone 3 (Step S706). The quick connection unit 324 then reads from the link data storage 325 the profile information of the network before the quick mode, the profile information being stored on Step S620, to reconnect by use of the profile information (Step S707), and displays the PC link selection screen being a top screen of the link unit 32 (Step S708).

Example of Screen Used in Processing Sequence in Quick Mode

FIG. 17A is an exemplary illustration of the direct reception start screen. As depicted in FIG. 17A, when the in-box is selected by the PC 2, the PC 2 displays the direct reception button to receive files from the mobile phone 3. In FIG. 17A, the PC 2 is able to capture files such as pictures and moving images from the mobile phone 3.

Figure 17B:
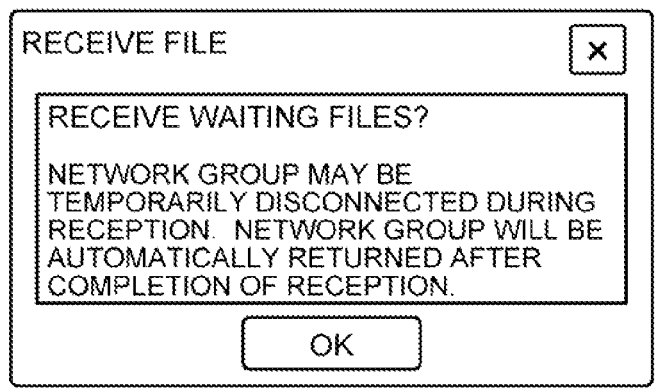
FIG. 17B is an exemplary illustration of a file reception screen.

FIG. 17B is an exemplary illustration of the file reception screen. As depicted in FIG. 17B, the PC 2 displays a reception confirmation message before receiving files from the mobile phone 3. Furthermore, the PC 2 displays a message to the effect that the network that has already been constructed may temporarily be disconnected during the reception of files.

FIG. 17C is an exemplary illustration of the away-from-home mode screen. As depicted in FIG. 17C, the PC 2 displays a message prompting the user to input a passkey for a case of connecting in public places such as away from home before receiving files from the mobile phone 3. The PC 2 then displays a text box for inputting a passkey. After inputting a passkey on the screen in FIG. 17C, the user instructs to start automatic connection with the mobile phone 3 in order to receive files from the mobile phone 3; accordingly, the PC 2 executes communication (direct reception) where security is further strengthened in addition to authentication with an encryption key. If the automatic connection is started without the user inputting a passkey on the screen in FIG. 17C, the PC 2 is to execute communication (direct reception) where security is secured by authentication with an encryption key.

FIG. 17D is an exemplary illustration of the file selection screen. As depicted in FIG. 17D, the mobile phone 3 displays files that are able to be transmitted directly to the PC 2. The user controls the file selection screen in FIG. 17D to select desired files such as pictures, moving images and music data, and the mobile phone 3 is able to transmit the selected files to the PC 2 based on the selection control of the user.

Figure 17E:
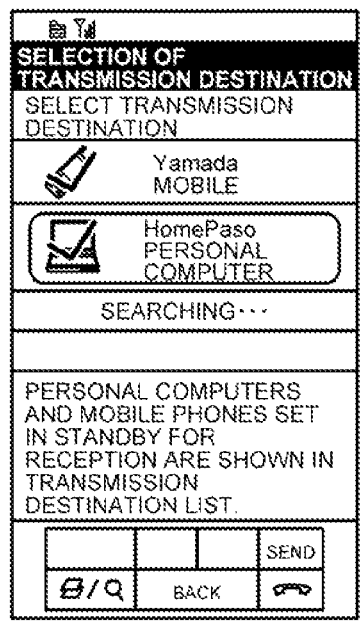
FIG. 17E is an exemplary illustration of a transmission destination selection screen.

FIG. 17E is an exemplary illustration of the transmission destination selection screen. As depicted in FIG. 17E, the mobile phone 3 displays the list of devices being transmission destinations to which the selected files can be transmitted directly. The user selects a desired transmission destination device from the device list displayed as depicted in FIG. 17E, and the mobile phone 3 transmits the files directly to the transmission destination device based on the selection control of the user. With regard to the selection of transmission destinations, the mobile phone 3 may be capable of selecting a plurality of transmission destinations at a time, or may be capable of selecting transmission destinations one by one.

In the embodiment, description was given assuming that the mobile phone 3 is operated as a station (STA). However, the mobile phone 3 may operate as an access point (AP). In this case, the quick connection unit 324 of the mobile phone 3 requests the WLAN unit 31 to deactivate the AP unit 311 before searching for a PC to operate as an AP (Step S612). After the completion of deactivating the AP unit 311, the quick connection unit 324 then requests the WLAN unit 31 to activate the STA unit 312. It is sufficient as long as the quick connection unit 324 then shifts to Step S612 to search a PC to operate as an AP after the completion of activating the STA unit 312.

Software Configuration

Figure 18:
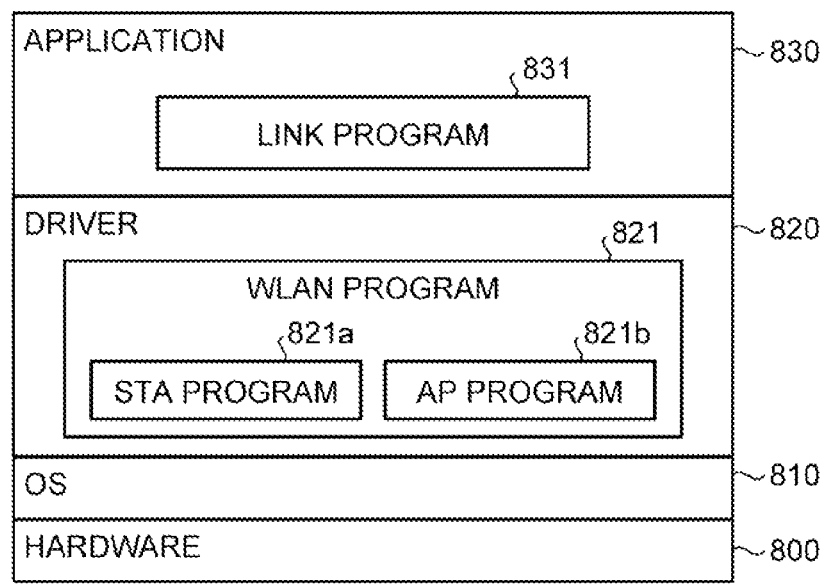
FIG. 18 illustrates a software configuration.

Next, a description will be given of a software configuration for establishing a link between the PC 2 and the mobile phone 3. FIG. 18 illustrates a software configuration. As depicted in FIG. 18, software for establishing a link between the PC 2 and the mobile phone 3 includes an OS 810, a driver 820, and an application 830. The OS 810, the driver 820, and the application 830 establish a link process in cooperation with hardware 800.

The driver 820 includes a WLAN program 820. The WLAN program 820 to be executed in the PC 2 implements the function of the WLAN unit 21 depicted in FIG. 3. Moreover, the WLAN program 820 to be executed in the mobile phone 3 implements the function of the WLAN unit 31 depicted in FIG. 3. The WLAN program 820 includes an STA program 821*a* and an AP program 821*b*. The STA program 821*a* and the AP program 821*b*, which are executed in the PC 2, implement the functions of the STA unit 212 and the AP unit 211 depicted in FIG. 3. Moreover, the STA program 821*a* and the AP program 821*b*, which are executed in the mobile phone 3, implement the functions of the STA unit 312 and the AP unit 311 that are depicted in FIG. 3.

The application 830 includes a link program 831. The link program 831 to be executed in the PC 2 implements the function of the link unit 22 depicted in FIG. 3. Moreover, the link program 831 to be executed in the mobile phone 3 implements the function of the link unit 32 depicted in FIG. 3. The link program 831 links with another information communication device by use of the WLAN program 821. In other words, the link program 831 of the PC 2 (or the mobile phone 3) executes the link process with the link program 831 of the mobile phone 3 (or the PC 2).

Hardware Configuration of Mobile Phone

Figure 19:
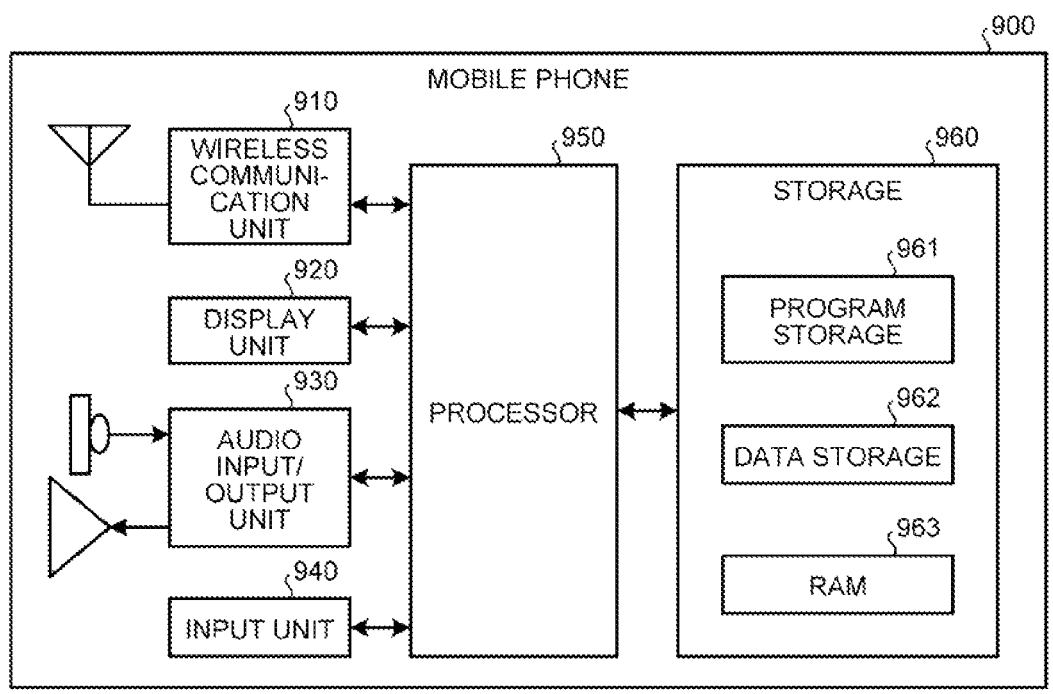
FIG. 19 illustrates a hardware configuration of a mobile phone.

FIG. 19 illustrates a hardware configuration of a mobile phone. As depicted in FIG. 19, a mobile phone 900 includes a wireless communication unit 910, a display unit 920, an audio input/output unit 930, an input unit 940, a processor 950, and a storage 960. The wireless communication unit 910, the display unit 920, the audio input/output unit 930, the input unit 940, and the storage 960 are connected to the processor 950, respectively.

The storage 960 includes a program storage 961, a data storage 962, and a RAM (Random Access Memory) 963. Programs such as the link program 831 for implementing the function of the link unit 32 depicted in FIG. 3 are stored on the program storage 961. Various data such as an SSID, an encryption key, device information, and setting information, which are stored on the link data storage 225 depicted in FIG. 4, are stored on the data storage 962. The storage 960 is, for example, a semiconductor memory device such as a RAM and a flash memory, or a storage device such as a hard disk drive (HDD) and an optical disk.

The processor 950 is an integrated circuit such as an ASIC (Application Specific Integrated Circuit) and an FPGA (Field Programmable Gate Array), or an electronic circuit such as a CPU (Central Processing Unit) and an MPU (Micro Processing Unit). Additionally, the processor 950 reads programs such as the link program 831 from the storage 960 to load the programs into the RAM 963; accordingly, the programs such as the link program 831 are to function as processes such as the link process. The link process then loads, for example, the information read from the data storage 962 into an area allocated to itself on the RAM 963 as appropriate to execute various data processes based on, for example, the loaded data.

Hardware Configuration of PC

Figure 20:
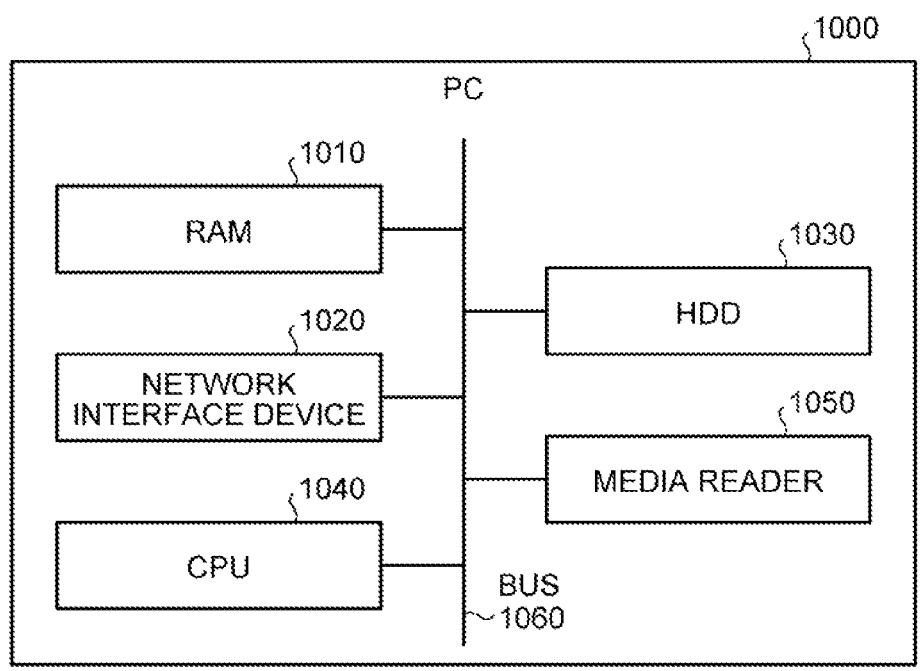
FIG. 20 illustrates a hardware configuration of a PC.

FIG. 20 illustrates a hardware configuration of a PC. As depicted in FIG. 20, a PC 1000 includes a RAM 1010, a network interface device 1020, an HDD 1030, a CPU 1040, a media reader 1050, and a bus 1060. The RAM 1010, the network interface device 1020, the HDD 1030, the CPU 1040, and the media reader 1050 are connected by the bus 1060.

Additionally, programs such as the link program 831 for implementing the function of the link unit 32 depicted in FIG. 3 are stored on the HDD 1030. Moreover, various data such as an SSID, an encryption key, device information, and setting information, which are stored on the link data storage 225 depicted in FIG. 4, are stored on the HDD 1030.

Additionally, the CPU 1040 reads the link program 831 from the HDD 1030 to load the program into the RAM 1010; accordingly, the link program 831 is to function as the link process. The link process then loads the information read from, for example, the HDD 1030 into an area allocated to itself on the RAM 963 as appropriate to execute various data processes based on, for example, the loaded data.

The media reader 1050 reads programs such as the link program 831 from, for example, a medium for storing programs in the case where the programs such as the link program 831 are not stored on the HDD 1030. The media reader 1050 is, for example, a CD-ROM or an optical disk device.

The network interface device 1020 is a device for connecting with an external device via a network and supporting wireless networking.

Incidentally, the above link program 831 may be stored in, for example, another computer (or server) connected to the PC 1000 via, for example, a public line, the Internet, LAN, WAN (Wide Area Network). In this case, the PC 1000 reads the link program 831 from another computer or the like via the network interface device 1020 to execute the link program 831.

Effects of Embodiment

In the embodiment, the link unit 22 of the PC 2 adds an identifier used for identifying a device to an SSID for use in operating normally as an AP for wireless communication. Additionally, when receiving a request to search an AP from the mobile phone 3 to execute the station function, the link unit 22 transmits an SSID (a setup-mode SSID) newly acquired as a result of the addition as a response to the search request. According to such a configuration, the link unit 22 is configured to transmit a new SSID to which an identifier used for identifying a device is added as a response to the request to search an AP, which allows the mobile phone 3 that has transmitted the search request to identify a device of an AP. As a result, the link unit 22 is able to cause the mobile phone 3 to execute the station function to connect to an intended AP.

Moreover, in the embodiment, the link unit 22 adds an identifier in accordance with an operating mode to an SSID for use in operating normally as an AP for wireless communication. According to such a configuration, the link unit 22 is configured to add an identifier in accordance with an operating mode to an SSID for use in operating normally, which allows the mobile phone 3 to receive the new identifier-added SSID remove an AP to normally connect with. As a result, the link unit 22 is able to cause the mobile phone 3 to execute the station function to connect with an intended AP.

Moreover, in the embodiment, the link unit 22 adds an identifier in accordance with the category of the device itself to an SSID for use in operating normally as an AP for wireless communication. According to such a configuration, the link unit 22 is configured to add to an SSID an identifier in accordance with the category of the device itself, which allows the mobile phone 3 to receive the new identifier-added SSID identify a desired AP to connect with in accordance with the device category of the AP. As a result, the link unit 22 is able to cause the mobile phone 3 to execute the station function to connect with an intended AP.

Moreover, in the embodiment, the link unit 22 further adds an identifier indicating whether to request a password from the mobile phone 3 executing the station function to an SSID for use in operating normally as an AP for wireless communication. According to such a configuration, the link unit 22 is configured to add to an SSID an identifier indicating whether to request a password, which allows for strengthening of security in a connection with the mobile phone 3 executing the station function.

Moreover, in the embodiment, the link unit 32 executing the station function transmits a request to search an AP. The link unit 32 then receives a new SSID to which an identifier used for identifying a device is added (a setup-mode SSID) as a response to the transmitted search request from an information communication device to execute the AP function. The link unit 32 then establishes a connection with the information communication device that has transmitted the new SSID by use of the received new SSID. According to such a configuration, the link unit 32 receives the new SSID to which an identifier used for identifying a device of an AP is added, which allows for identification of a desired device of an AP to connect with based on the new SSID. As a result, the link unit 32 is able to inhibit an accidental connection with an unintended device of an AP.

Moreover, in the embodiment, the link unit 32 generates an encryption key on the same conditions as specific conditions for use when an information communication device to execute the AP function generates an encryption key by use of the received new SSID. The link unit 32 then establishes a connection with the information communication device by use of the generated encryption key. According to such a configuration, the link unit 32 is configured to automatically generate an encryption key on the same specific conditions as those of the information communication device of the AP by use of the new SSID, which allows for easy establishment of a connection with the information communication device.

Moreover, in the embodiment, the link unit 32 reestablishes a connection with the information communication device that has established a connection with the new SSID by use of an SSID for normal operation included in the new SSID after processing of connection establishment and completing handshake to a certain extent. According to such a configuration, the link unit 32 is configured to reconnect with the device that has established a connection by use of the SSID for normal operation after establishing a connection with the new SSID, which allows for secure establishment of a connection with a desired AP to connect with.

Moreover, in the embodiment, the link unit 32 deletes the new SSID and the encryption key generated with the new SSID after completing handshake. According to such a configuration, the link unit 32 becomes able to know the device information of the device of the AP as a result of the completion of handshake, which allows for deletion of information not to be used when operating normally. As a result, the link unit 32 is able to increase usable storage capacity.

Moreover, in the embodiment, when receiving a plurality of new SSIDs having the same identifier, the link unit 32 prompts the user to select any of SSIDs from the new SSIDs. According to such a configuration, when receiving a plurality of new SSIDs having the same identifier, the link unit 32 is able to prompt the user to select a device of an AP, which allows for connection with an intended AP.

Moreover, in the embodiment, if being requested by the mobile phone 3 to execute the station function of wireless communication to transmit device information and wireless LAN information, the link unit 22 of the PC 2 transmits to the mobile phone 3 information in the device itself for executing the access point function of wireless communication. When receiving a notification of completing receiving the transmitted information from the mobile phone 3, the link unit 22 of the PC 2 then requests the mobile phone 3 to transmit the device information and the wireless LAN information. According to such a configuration, the link unit 22 of the PC 2 transmits to the mobile phone 3 the device information and wireless LAN information in the device itself, which allows for conveyance to the mobile phone 3 the information used for a connection of wireless communication in the device itself. Moreover, the link unit 22 of the PC 2 requests the mobile phone 3 to transmit the device information and the wireless LAN information, which allows for reception of the information used for a connection of wireless communication in the mobile phone 3. As a result, the PC 2 and the mobile phone 3, which communicate by radio, are able to acquire mutual information used for a connection of wireless communication.

Moreover, in the embodiment, when receiving the information of the mobile phone 3 as a response to the request to transmit the device information and the wireless LAN information, the link unit 22 of the PC 2 stores the received information on the link data storage 225. According to such a configuration, the link unit 22 of the PC 2 stores the information used for a connection of wireless communication in the mobile phone 3, which allows for simplification of connection even when the functions of an AP and a station are interchanged between the PC 2 and the mobile phone 3 in the future.

Moreover, in the embodiment, the device link unit 222 of the PC 2 acquires the setting information file from the mobile phone 3 and displays functions of linking with the mobile phone 3, in other words, data that can be captured from the mobile phone 3, based on the information on the acquired setting information file. Therefore, data that the user of the mobile phone 3 does not desire is prevented from being captured in the PC 2.

Moreover, in the embodiment, the link unit 32 of the mobile phone 3 operates to establish a connection only with one PC 2 selected by the user in a state linkable with a plurality of PCs 2, and the selected one PC 2 confirms that the device information of the mobile phone 3 has been registered in the device itself, and operates to establish the connection. After the connection is established in this manner, the device link processing is executed between the mobile phone 3 and the one PC 2. Therefore, data transmission to PCs 2 for which the connection is not established (PCs to which data should not be transmitted), even if linkable, is prevented in the mobile phone 3. Moreover, the capture of useless data from the mobile phone 3 is prevented in the PC 2. Accordingly, data privacy is secured without leaking data in the mobile phone 3 to irrelevant devices.

Moreover, in the embodiment, the Internet connection units 223 and 323 dissolve the PC-mobile phone link where the PC 2 operates as an AP and the mobile phone 3 operates as an STA, and cause the PC 2 and the mobile phone 3 to operate as an STA and an AP, respectively. The Internet connection units 223 and 323 then connect the PC 2 to the Internet via the mobile phone 3. Accordingly, the user can easily switch an AP and an STA between the PC 2 and the mobile phone 3. Therefore, the user can easily use the Internet with the PC 2 simply by setting the PC-mobile phone link also in a case where the PC 2 is not connected to a network, such as outdoors.

Moreover, in the embodiment, the quick connection unit 324 of the mobile phone 3 searches devices of APs, extracts devices being in a state of waiting for the execution of direct reception from devices that responded to the search, and carries out the establishment of a connection and the transmission of data for each of a plurality of devices selected by the user from the extracted devices, based on connection information for permitting connection in the devices waiting for the execution of direct reception. According to such a configuration, the quick connection unit 324 of the mobile phone 3 need not previously register setting information on each of devices to transmit data to, and is able to connect with a plurality of devices to easily transmit data to these devices.

Moreover, in the embodiment, the quick connection unit 324 of the mobile phone 3 uses an encryption key generated on the same conditions as the specific conditions used when a device in a state of waiting for the execution of direct reception generates an encryption key as information on a connection with the device. According to such a configuration, the quick connection unit 324 of the mobile phone 3 is configured to automatically generate an encryption key on the same specific conditions as those of the device in a state of waiting for the execution of direct reception, which allows for establishment of a temporary connection in a state where security is maintained without advance setup (authentication and registration) for the device.

Moreover, in the embodiment, if being unable to transmit data to a certain target device among a plurality of devices as data transmission targets, the quick connection unit 324 of the mobile phone 3 does not execute retransmission processing at the time of the failure in transmission, and shifts to processing of transmitting data to another target device among the plurality of devices. Additionally, after it is determined by the determination process to have executed the data transmission processing on all of the plurality of devices, the quick connection unit 324 reexecutes the connection establishment processing and the data transmission processing on the target device to which data was unable to be transmitted. According to such a configuration, the possibilities increase that the cause of the failure in data transmission is resolved and that the transmission succeeds by the processing of retransmitting data while the data transmission processing is being executed on all of the plurality of target devices. For example, if the cause of incomplete transmission is an error related to receivable capacity, the cause of the error can be resolved by the operation of reserving receivable capacity in a link target device. Moreover, for example, if the cause of incomplete transmission is that a response to a file reception request and a file acquisition request have not been received from the quick connection unit 324, the cause can be resolved by things such as reducing the load on processing of the PC 2 and resolving network congestions. Moreover, the period until data is transmitted to all target devices is shortened by the above-mentioned retransmission processing.

Others

Moreover, in the embodiment, description was given of the case where n number of PCs and one mobile phone are linked; however, the present invention is not limited thereto, and is similarly applicable also to a case where n number of PCs and m (m is two or more) number of mobile phones are linked.

Moreover, in the embodiment, description was given of the case where a PC and a mobile phone are linked; however, the present invention is not limited thereto, and is similarly applicable also to a case where devices having a wireless LAN function, such as a PC and a PC, a mobile phone and a mobile phone, and a mobile phone and another device, are linked.

According to an aspect of a program of the invention, a new technology for setting information used for the connection of a wireless LAN is provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for linking between a first information communication device and a second information communication device in wireless communication, the method comprising:
transmitting, by the first information communication device, information for a connection of wireless communication, the information for a connection of wireless communication being a Service Set Identifier (SSID) for connection operation which includes an SSID for normal operation, an operation mode, a presence or an absence of passkey which is a password for authentication, and an identifier of a device which executes the access point function, the information being of the first information communication device executing any one of a station function and an access point function of wireless communication, to the second information communication device executing the other function at request of the second information communication device to transmit the information,
storing, by the second information communication device, a received information on a storage of the second information communication device when receiving the transmitted information,
requesting, by the first information communication device, the second information communication device to transmit the information when receiving a notification of receipt of the transmitted information from the second information communication device, and
storing, by the first information communication device, the received information on a storage of the first information communication device when receiving the information of the second information communication device as a response to the request to transmit the information.

2. The method according to claim 1, wherein
the first information communication device executes the access point function while the second information communication device executes the station function.

3. The method according to claim 1, further comprising generating, by the second information communication device, an encryption key using the SSID for connection operation and a specific condition when receiving the SSID for connection operation, and
storing, by the second information communication device, the SSID for connection operation and the encryption key in a storage.

4. The method according to claim 3, further comprising transmitting, by the second information communication device, a connection request to which the encryption key is added to the first information communication device to execute authentication and registration with the first information communication device.

5. The method according to claim 2, further comprising the second information communication device,
extracting the SSID for normal operation from the SSID for connection operation,
deleting the SSID for connection operation from the storage after the authentication and registration with the first information communication device,
disconnecting the wireless communication with the first information communication device, and
searching for a counterpart of communication using the SSID for normal operation.

6. A system for linking between information communication devices in wireless communication, the system including:
a first information communication device including:
a first storage that stores information for a connection of wireless communication,
a first transmission unit that transmits information for a connection of wireless communication, the information being of the first information communication device executing any one of a station function and an access point function and stored on the first storage, to a second information communication device executing the other function at request of the second information communication device to transmit the information,
an information request unit that requests the second information communication device to transmit the information when receiving a notification of receipt of the information transmitted by the first transmission unit from the second information communication device, and a first information storing unit that, when receiving the information of the second information communication device as a response to the transmission request of the information request unit, stores the received information on the first storage; and the second information communication device including:

a second storage that stores information for a connection of wireless communication, a second information storing unit that, when receiving the information transmitted by the first transmission unit, stores the received information of the first information communication device on the second storage, and a second transmission unit that transmits to the first information communication device the information of the second information communication device stored on the second storage at request of the information request unit to transmit the information;

wherein the information for a connection of wireless communication is a Service Set Identifier (SSID) for connection operation which includes an SSID for normal operation, an operation mode, a presence or an absence of passkey which is a password for authentication, and an identifier of a device which executes the access point function.

7. A non-transitory computer-readable storage medium having stored therein a program causing first and second information communication devices to execute a process comprising:

transmitting, by the first information communication device, information for a connection of wireless communication, the information for a connection of wireless communication being a Service Set Identifier (SSID) for connection operation which includes an SSID for normal operation, an operation mode, a presence or an absence of passkey which is a password for authentication, and an identifier of a device which executes the access point function, the information being of the first information communication device executing any one of a station function and an access point function of wireless communication, to the second information communication device executing the other function at request of the second information communication device to transmit the information, storing, by the second information communication device, a received information on a storage of the second information communication device when receiving the transmitted information, requesting, by the first information communication device, the second information communication device to transmit the information when receiving a notification of receipt of the transmitted information from the second information communication device, and storing, by the first information communication device, the received information on a storage of the first information communication device when receiving the information of the second information communication device as a response to the request to transmit the information.

* * * * *